(12) United States Patent
England et al.

(10) Patent No.: US 7,477,360 B2
(45) Date of Patent: Jan. 13, 2009

(54) METHOD AND APPARATUS FOR DISPLAYING A 2D IMAGE DATA SET COMBINED WITH A 3D RANGEFINDER DATA SET

(75) Inventors: James N. England, Chapel Hill, NC (US); Aron T. Helser, Chapel Hill, NC (US); Benjamin C. Elgin, Hillsborough, NC (US); Richard L. Holloway, Chapel Hill, NC (US)

(73) Assignee: DeltaSphere, Inc., Chapel Hill, NC (US)

( * ) Notice: Subject to any disclaimer, the term of this patent is extended or adjusted under 35 U.S.C. 154(b) by 198 days.

(21) Appl. No.: 11/351,248

(22) Filed: Feb. 9, 2006

(65) Prior Publication Data

US 2006/0244746 A1 Nov. 2, 2006

Related U.S. Application Data

(60) Provisional application No. 60/652,208, filed on Feb. 11, 2005.

(51) Int. Cl.
*G01C 3/08* (2006.01)
(52) U.S. Cl. .................................... 356/4.01
(58) Field of Classification Search ......... 356/4.01–4.1, 356/3.01–3.15, 5.01–5.15, 6–22
See application file for complete search history.

(56) References Cited

U.S. PATENT DOCUMENTS 5,309,212 A 5/1994 Clark
5,577,130 A 11/1996 Wu
5,715,166 A 2/1998 Besl
5,734,384 A 3/1998 Yanof et al.
5,878,152 A 3/1999 Sussman
5,988,862 A 11/1999 Kacyra (Continued)

OTHER PUBLICATIONS

Acuity Research, "AccuRange 4000, Accurange High Speed Interface, Accurange Line Scanner User's Manual", product manual, Dec. 15, 1999, Menlo Park CA.

(Continued)

*Primary Examiner*—Thomas H Tarcza
*Assistant Examiner*—Luke D Ratcliffe
(74) *Attorney, Agent, or Firm*—Jenkins, Wilson, Taylor, & Hunt, P.A.

(57) ABSTRACT

Method, computer program product, and apparatus for displaying a 2D image data set combined with a 3D range data set. A 3D range data set and at least one 2D image data set which differs from the 3D range data set in resolution, origin, or both, are provided. The 3D range data set is represented as a first displayed image while each 2D image data set is represented as at least a second displayed image. Corresponding features are identified within each displayed image. 3D transformation is computed between the 3D range data set and at least one 2D image data set using the specified corresponding features to establish geometric correspondence. At least one 2D image data set is represented as a third displayed image, wherein a 3D coordinate can be computed for any specified pixel of each 2D image data set using the 3D transformation and 3D range data set.

31 Claims, 20 Drawing Sheets
(15 of 20 Drawing Sheet(s) Filed in Color)

U.S. PATENT DOCUMENTS

| | | | |
|---|---|---|---|
| 6,083,162 | A | 7/2000 | Vining |
| 6,246,468 | B1 | 6/2001 | Dimsdale |
| 6,246,898 | B1 | 6/2001 | Vesely et al. |
| 6,346,940 | B1 | 2/2002 | Fukunaga |
| 6,483,950 | B1 | 11/2002 | Wallack |
| 6,590,640 | B1 | 7/2003 | Aiken et al. |
| 6,628,279 | B1 | 9/2003 | Schell et al. |
| 6,704,099 | B2 | 3/2004 | Uomori et al. |
| 6,915,008 | B2 | 7/2005 | Barman et al. |
| 6,922,234 | B2 | 7/2005 | Hoffman |
| 6,970,591 | B1 * | 11/2005 | Lyons et al. ............... 382/154 |
| 6,980,690 | B1 | 12/2005 | Taylor et al. |
| 6,992,685 | B2 | 1/2006 | Hallbauer et al. |
| 7,177,486 | B2 | 2/2007 | Stewart et al. |
| 7,206,462 | B1 | 4/2007 | Betke et al. |
| 7,215,430 | B2 * | 5/2007 | Kacyra et al. ............... 356/601 |
| 7,403,268 | B2 | 7/2008 | England et al. |
| 2005/0028111 | A1 | 2/2005 | Schrag et al. |
| 2005/0280714 | A1 | 12/2005 | Freeman |
| 2006/0115133 | A1 | 6/2006 | Potter et al. |
| 2006/0181527 | A1 | 8/2006 | England et al. |
| 2006/0182314 | A1 | 8/2006 | England et al. |
| 2006/0193521 | A1 | 8/2006 | England et al. |
| 2007/0064976 | A1 | 3/2007 | England, III |

OTHER PUBLICATIONS

Acuity Research, "AccuRange 4000 laser rangefinder", product literature, URL http://www.acuityresearch.com/pdf/ar4000-data-sheet.pdf, Feb. 10, 2005.

Leica Geosystems, "Leica Cyclone 5.4 Technical Specifications", product literature, URL http://www.leica-geosystems.com/hds/en/Cyclone$_{13}$ 5.4_Technical_Specifications.pdf, Mar. 15, 2006.

3RDTech Inc, "DeltaSphere 3000 Laser 3D Scene Digitizer", product literature, Jun. 22, 2000.

3RDTech Inc, "Revolutionary 3D Scene Capture, Viewing and Analysis", product literature, URL: http://www.deltasphere.com/images/deltaspheredatasheet_112204s.pdf, Nov. 22, 2004.

Nyland et al., "Capturing, Processing and Rendering Real-World Scenes", Videometrics and Optical Methods for 3D Shape Measurement, Electronic Imaging 2001, Photonics West, SPIE vol. 4309 Jan. 22, 2001.

Canesta Inc., "Development Platform DP100", Jun. 26, 2003.

Canesta Inc., "CanestaVision Chips", URL http://www.canesta.com/html/sensors.htm, 2006.

Gokturk et al., "A Time-of-Flight Depth Sensor—System Description, Issues and Solutions" 2004 Conference on Computer Vision and Pattern Recognition Workshop (CVPRW'04) vol. 3.

Tsai, "An Efficient and Accurate Camera Calibration Technique for 3D Machine Vision", Proceedings of IEEE Conference on Computer Vision and Pattern Recognition, Miami Beach, FL, pp. 364-374, 1986.

Turk et al., "Zippered polygon meshes from range images", Computer Graphics, ACM SIGGRAPH 94 Proceedings, Orlando, Fla., pp. 311-318, 1994.

Innovmetric Inc., "PolyWorks Total Point Cloud Inspection and Reverse-Engineering Software Solution", product literature, URL http://www.innovmetric.com/Manufacturing/pdf/brochureWeb.pdf, 2003.

Besl et al., "A Method for Registration of 3-D Shapes", IEEE Transactions on Pattern Analysis and Machine Intelligence, vol. 14 (1992), No. 2, 239-256.

Bernardini et al., "The 3D Model Acquisition Pipeline" vol. 21 (2002), No. 2 pp. 149-172, Computer Graphics forum.

Faugeras et al., "The representation, recognition, and locating of 3-d objects", International Journal of Robotic Research, 5(3):27-52, Fall 1986.

Arun et al., "Least-Squares Fitting of Two 3D Point Sets", in IEEE Transactions on Pattern Analysis and Machine Intelligence, vol. 9 (1987), 698-700.

Acuity Research, "Accurange Line Scanner", product literature, URL http://www.acuityresearch.com/pdf/line-scanner-data-sheet.pdf, Oct. 17, 2005.

3RDTech Inc., "SceneVision-3D Functions", product literature, URL http://www.deltasphere.com/scenevision_specs.htm, Feb. 28, 2006.

Notice of Allowance and Fee(s) Due in U.S. Appl. No. 11/351,246, filed Sep. 4, 2008.

Notice of Allowance and Fee(s) Due in U.S. Appl. No. 11/351,235, filed Mar. 31, 2008.

Non-Final Official Action in U.S. Appl. No. 11/351,248, filed Jan. 23, 2008.

Non-Final Official Action in U.S. Appl. No. 11/351,235, filed Nov. 6, 2007.

Ellekilde et al., "Fusing Range and Intensity Images for Generating Dense Models of Three-Dimensional Environments," Proceedings of the 2006 IEE International Conference on Man-Machine Systems (Sep. 2006).

Kil et al., "Laser Scanner Super-resolution," Eurographics Symposium on Point-Based Graphics (Jul. 29-30, 2006).

Oggier et al., "SwissRanger SR3000 and First Experiences based on Miniaturized 3D-TOF Cameras," Proceedings of the 1$^{st}$ Range Imaging Research Day at ETH Zurich, Switzerland (Sep. 8-9, 2005).

Stone et al., "Performance Analysis of Next-Generation LADAR for Manufacturing, Construction, and Mobility," National Institutes of Standards and Technology NISTIR 7117 (May 2004).

Gokturk et al., "A Time-of-Flight Depth Sensor—System Description, Issues and Solutions," IEEE Conference on Computer Vision and Pattern Recognition Workshop (2004).

Park et al., "Super-Resolution Image Reconstruction: A Technical Overview," IEEE Signal Processing Magazine (May 2003).

Non-Final Official Action in U.S. Appl. No. 11/523,292, filed Jul. 7, 2008.

Non-Final Official Action in U.S. Appl. No. 11/351,234, filed Apr. 29, 2008.

Non-Final Official Action in U.S. Appl. No. 11/351,246, filed Jan. 22, 2008.

Notification of Transmittal of the International Search Report and the Written Opinion of the International Searching Authority, or the Declaration for International Application No. PCT/US06/36459 (Oct. 23, 2007).

Han et al., "Feature Recognition from CAD Models," IEEE Computer Graphics and Applications, pp. 80-94 (Mar./Apr. 1998).

Jensen et al., "Subpixel Edge Localization and the Interpolation of Still Images," IEEE Transactions on Image Processing, vol. 4, No. 3, pp. 285-295 (Mar. 1995).

* cited by examiner

METHOD AND APPARATUS FOR DISPLAYING A 2D IMAGE DATA SET COMBINED WITH A 3D RANGEFINDER DATA SET

CROSS REFERENCE TO RELATED APPLICATIONS

This patent application claims the benefit of U.S. provisional application Ser. No. 60/652,208 filed Feb. 11, 2005, the entire contents of which are incorporated by reference herein.

FIELD OF THE INVENTION

The present invention relates to 3D rangefinder processing technology generally, and more particularly relates to methods, computer program products, and apparatus for displaying a 2D image data set obtained using a 2D imaging device combined with a 3D range data set obtained using a 3D rangefinder device.

BACKGROUND OF THE INVENTION

A rangefinder is a device for measuring the range from the device to some physical surface. A laser rangefinder can be one of many known types of rangefinders. Laser rangefinders are sometimes known as LIDAR (Light Detection and Ranging) or LADAR (Laser Detection and Ranging) systems. Laser rangefinders use a variety of techniques to measure the range from the apparatus to a surface from which the laser beam is reflected. A typical apparatus may in some manner measure the round trip time-of-flight of the beam from the apparatus's emitter to the target, or the reflector, and back to the apparatus's receiver. One such apparatus is generally commercially available from Acuity Research and known as the AR4000 laser rangefinder, which can be found at URL http://www.acuityresearch.com, for example. Information on example laser rangefinder technology can be found in U.S. Pat. No. 5,309,212 which describes establishing an oscillator whose frequency is dependent on the time-of-flight of the laser beam and then measuring the time period of that oscillator. Since the speed of light is known, this time period measurement can then be readily converted to indicate the range from the apparatus to a surface that reflects the laser beam. A digital interface to a computer is typically included in such rangefinders. Other examples of laser and other rangefinders can be found in the text "Sensors for Mobile Robots: Theory and Application" by H. R. Everett (A. K. Peters, Ltd., 1995).

A rangefinder's laser beam may be directed in various directions by physically pointing the apparatus, by using one or more moving mirrors or prisms under manual or computer control, or both. A common configuration scans the beam in one plane and is called a line scanner, such as that sold commercially by Acuity Research and found at their website, for example. This apparatus includes a laser rangefinder that directs the beam end-on toward a rotating 45-degree mirror. The beam is thus turned at 90 degrees and sweeps out an arc as the 45-degree mirror rotates. The resulting data is a set of range data points representing the profile of an object or space. For example, if the scanned beam is directed at an automobile, a set of data points representing a profile of the automobile is produced.

The rangefinder's laser beam may also be directed to scan in two dimensions by physically pointing the apparatus, by using one or more moving mirrors or prisms, or both. As such the rangefinder's laser beam can thus acquire range measurements to a host of points within the environment. This type of apparatus is sometimes referred to as a scanning 3D laser rangefinder or just scanning laser rangefinder. In general, the three dimensions comprise two dimensions of scanning, such as X and Y, plus range or distance between the rangefinder and a point in space at which the laser beam is directed.

In order to acquire the range measurements to multiple points within an area, the rangefinder beam may be steered under manual or computer control. The steering may be accomplished directly through physical movement or optically through the use of mirrors or prisms. A scanning laser rangefinder sweeps the beam in two directions to cover an area. For example, a scanning laser rangefinder developed by Cyra Technologies Inc. sweeps the beam in an X,Y raster pattern through the use of mirrors. Information on the Cyra rangefinder technology is disclosed in U.S. Pat. No. 5,988,862. As a further example, we discuss the DeltaSphere 3000 laser scanner, such as 100 shown in FIG. 1. As seen, the laser scanner mounts on a tripod 105, includes a laser rangefinder 140, and is controlled by an embedded computer 150. The laser scanner sweeps the laser beam 110 in elevation using a rotating 45-degree mirror 120 and in azimuth by rotating 130 the laser and mirror assembly. Information on the DeltaSphere 3000 laser scanner product can be found at URL http://www.deltasphere.com. Further background on the technology for the DeltaSphere 3000 laser scanner can be found in "Capturing, Processing and Rendering Real-World Scenes", Videometrics and Optical Methods for 3D Shape Measurement, Electronic Imaging 2001, Photonics West, SPIE Vol. 4309 Jan. 22, 2001, an article by Lars Nyland, Anselmo Lastra, David K. McAllister, Voicu Popescu, and Chris McCue.

Other examples of scanning laser rangefinders can be found in "Sensors for Mobile Robots: Theory and Application" by H. R. Everett (A. K. Peters, Ltd., 1995). The results of these scans are 3D data sets sometimes referred to as "3D point clouds". Similar data is provided by a rangefinder array design, such as those made commercially by Canesta Inc., also known as a range camera, that enables measurement of multiple range points at once. Information may be found at URL http://www.canesta.com/.

Various 3D rangefinder technologies may collect data at various rates ranging from 1 sample per second to several hundred thousand samples per second, but all provide essentially the same results, an array of 3D points where at least the range, elevation, and azimuth for each point is known. This representation in spherical coordinates may easily be transformed to X, Y, Z values in Cartesian coordinates. The rate of collecting the data points determines the time required to capture the data in the field, but obviously has no impact on later processing and use of the data. It will be clear that the methods discussed in this invention are independent of the speed of capture of the original data and that the methods apply to all forms of 3D rangefinder devices.

3D data sets collected by a 3D rangefinder may be presented as a visual display to a user in several different ways. The visualization techniques fall broadly into two classes, 3D displayed images and 2D displayed images.

A 3D displayed image format is one in which the user may select a particular 3D viewpoint and then view the 3D range data as geometric figures in perspective projection or in orthogonal projection or via some other projection within a 2D computer image. Techniques for creating 3D displayed images are well known from computer graphics textbooks such as "Computer Graphics: Principles and Practice in C" by James D. Foley, Andries van Dam, Steven K. Feiner, and John F. Hughes (Addison Wesley 1995). Well-known formats for a 3D displayed image may have the 3D range data samples represented as 3D points, also known as a point cloud, in which the same color is assigned to all points, in which false color is assigned to each point based on its range, in which color is assigned to each point based on its reflectance intensity (i.e. the strength of the signal returned from a surface to the 3D rangefinder), or in which points are colored via any other scheme. In another well-known 3D display technique, the 3D range data points may be linked together into a 3D mesh using well known computer graphics techniques, such that neighboring points are connected via lines within the display. The lines of the mesh may be colored using any of the techniques discussed above using well-known computer graphics techniques. In another 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may be determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

A 2D displayed image is one in which the 3D range data set is inherently represented as a 2D image. There are several well-known techniques for creating 2D displayed images since the data from a typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. Of course, the 2D displayed image need not be represented in spherical projection, but in any other well-known projection of a 3D data set to a 2D display. As illustrated in FIG. 2, for example, each pixel may have a multiplicity of associated values stored with it, including precise azimuth angle value 210, precise elevation angle value 220, range value 230, reflectance value 240, color 250 (RGB), and any other useful values 260. For example, a useful value might be some other attribute associated with the pixel. The color of each pixel within the 2D displayed image may be determined in any of a number of well-known formats. A Range Image has a false color assigned to each pixel based on its range. A Reflectance Image has a color assigned to each pixel based on the intensity of the reflected laser beam. A Registered Color Image has a color assigned to each pixel based on the color obtained from a color sensor such as a 2D digital camera such that the range data and color data are aligned as shown in FIG. 3. A Registered Color Image may typically be created by the steps of capturing a 3D range data set with a 3D rangefinder and displaying it as a Reflectance Image 310, capturing a 2D image using a calibrated digital color camera and displaying it as a 2D color image 320, identifying corresponding features between the two 2D images such as 311 and 321, 312 and 322, 313 and 323, and 314 and 324, using the locations of the corresponding features to compute the pose (location and orientation) of the 2D digital color camera, using the camera pose information to compute the optical path from the camera into the 3D data set, and applying the color from each pixel of the 2D color image to corresponding points of the 3D data set displayed as a 2D image. Using this method, the 3D range data and 2D color image need not have been acquired from the same viewpoint. Further information on the mathematics underlying the 2D image registration process may be found in an article by R. Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986.

Examples of a Range Image, a Reflectance Image, and a Registered Color Image may be found in an article by Lars Nyland, Anselmo Lastra, David K. McAllister, Voicu Popescu, and Chris McCue, titled "Capturing, Processing and Rendering Real-World Scenes", Videometrics and Optical Methods for 3D Shape Measurement, Electronic Imaging 2001, Photonics West, SPIE Vol. 4309 Jan. 22, 2001. The ability to create and display a Range Image, a Reflectance Image, and a Registered Color Image has been available in the DsControl, DsColor, and other software provided to DeltaSphere 3000 customers beginning some time ago.

When the 3D data set is displayed in any of the above formats, it is a well-known technique for a user to interactively select a particular pixel on the screen and to determine the X, Y, Z coordinates of the data represented at that pixel. In 2D displayed images, for example, the ability to select and display the X, Y, Z coordinates for any point in a Range Image, a Reflectance Image, and a Registered Color Image has been available in the DsControl and other software provided to DeltaSphere 3000 customers beginning some time ago. For 3D displayed images, commonly used computer graphics and computer-aided design software packages have enabled a user to pick a point, a point on a mesh, or a point on a surface and determine the X, Y, Z coordinates of that point. As another example, U.S. Pat. No. 6,922,234 discloses methods of making measurements within a reflectance image obtained from a laser scanner which captures data at up to 125,000 points per second.

Conventional methods for creating a registered color image assign a color from a 2D image to each sample of a 3D data set. The 3D data set may then be displayed in a 3D display format as a texture-mapped surface or it may be displayed in a 2D display format similar to a reflectance image but with the assigned color displayed for each sample of the 3D data set. Thus in this conventional method the displayed spatial resolution of the 2D image is equal to the spatial resolution of the 3D data set acquired by the 3D rangefinder. These conventional methods, for example, have been included in software provided to DeltaSphere customers beginning some time ago.

Depending on the type of 3D rangefinder and the type of 2D image capture device that are used, it is sometimes the case that the resolution of the original 2D image data is higher than the resolution of the original 3D range data. The effective resolution of a 2D image would also be higher if the 2D image was a close-up image, captured closer to an object of interest than the 3D rangefinder. Similarly the effective resolution of a 2D image would also be higher if the 2D image were captured by zooming in on area of interest with a telephoto lens for example.

In a conventional display method, the result is that information within a higher resolution 2D image is discarded in the registered color image display process. It would be advantageous, therefore, to have display techniques capable of representing the 2D image data at higher resolution than the current conventional methods allow. In many applications, such as in the reconstruction of crime, accident, and terrorism scenes, in the presentation of virtual tours of real estate, and in documentation of cultural heritage sites, an increase in displayed 2D registered color image resolution would be particularly desirable. With such, the understanding, analysis, and presentation of a scene would be greatly enhanced and new applications for 3D rangefinder technology could be enabled.

SUMMARY OF THE INVENTION

The present invention and its various embodiments seek to address at least some of the above needs and problems while attempting to deliver one or more of the above advantages. The present invention provides a number of embodiments that seek to allow a user to more effectively display a 2D image data set obtained using a 2D imaging device combined with a 3D range data set obtained using a 3D rangefinder device. As such, the user can more productively interact with 2D image data and 3D range data sets to allow applications to be better served. The present invention provides methods, computer program products, and apparatuses for displaying a 2D image data set obtained using a 2D imaging device combined with a 3D range data set obtained using a 3D rangefinder device.

In a first embodiment, the present invention provides a method for displaying a 2D image data set obtained using a 2D imaging device combined with a 3D range data set obtained using a 3D rangefinder device. First, the method includes the step of providing a 3D range data set. At least one 2D image data set is provided which differs from the 3D range data set in at least one of resolution, origin, and both resolution and origin. The 3D range data set can be represented as a first displayed image, while the at least one 2D image data set may be represented as at least a second displayed image. The method further identifies corresponding features within the first displayed image and within at least one second displayed image respectively. Thereafter, a 3D transformation between the 3D range data set and the at least one 2D image data set is computed based on the geometry of the specified corresponding features. As such, the geometric correspondence between the 3D range data set and at least one 2D image data set may be determined. The at least one 2D image data set can be represented as a third displayed image wherein a 3D coordinate can be computed for any specified pixel of the at least one 2D image data set based on the previously computed 3D transformation and the 3D range data set. Various other embodiments related to the preceding embodiment are provided.

A second embodiment of the invention provides a computer program product stored in computer readable media for execution in at least one processor. The computer program product may be used for displaying a 2D image data set obtained using a 2D imaging device combined with a 3D range data set obtained using a 3D rangefinder device. A number of software modules comprise this embodiment. A first software module for providing a first 3D range data set is included. Further, the embodiment provides a second software module for providing at least one 2D image data set which differs from the 3D range data set in at least one of resolution, origin, or both resolution and origin. A third software module for representing the 3D range data set as a first displayed image is provided. In addition, a fourth software module for representing the at least one 2D image data set as at least a second displayed image is included therein. The embodiment provides a fifth software module for identifying corresponding features within the first displayed image and within at least one second displayed image respectively. A sixth software module is provided for computing a 3D transformation between the 3D range data set and the at least one 2D image data set based on the geometry of the specified corresponding features. As such, the geometric correspondence between the 3D range data set and at least one 2D image data set may be determined. Further, a seventh software module for representing the at least one 2D image data set as a third displayed image is provided. Thus, a 3D coordinate can be computed for any specified pixel of the at least one 2D image data set based on the previously computed 3D transformation and the 3D range data set. Yet other embodiments related to the preceding computer program product embodiment are provided.

A third embodiment of the present invention comprises an apparatus for displaying a 2D image data set obtained using a 2D imaging device combined with a 3D range data set obtained using a 3D rangefinder device. The apparatus includes at least one computer processor therein, and a computer program product executing within the at least one computer processor. As such, a first software module for providing a first 3D range data set is provided. A second software module for providing at least one 2D image data set which differs from the 3D range data set in at least one of resolution, origin, and both resolution and origin is included. Further, the embodiment provides a third software module for representing the 3D range data set as a first displayed image. A fourth software module for representing the at least one 2D image data set as at least a second displayed image is provided. In addition, a fifth software module is included for identifying corresponding features within the first displayed image and within at least one second displayed image respectively. A sixth software module for computing a 3D transformation between the 3D range data set and the at least one 2D image data set based on the geometry of the specified corresponding features is provided. As such, the geometric correspondence between the 3D range data set and at least one 2D image data set can be determined. In addition, the embodiment provides a seventh software module for representing the at least one 2D image data set as a third displayed image. Thus, a 3D coordinate can be computed for any specified pixel of the at least one 2D image data set based on the previously computed 3D transformation and the 3D range data set. Further embodiments related to the apparatus embodiment are provided by the present invention.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
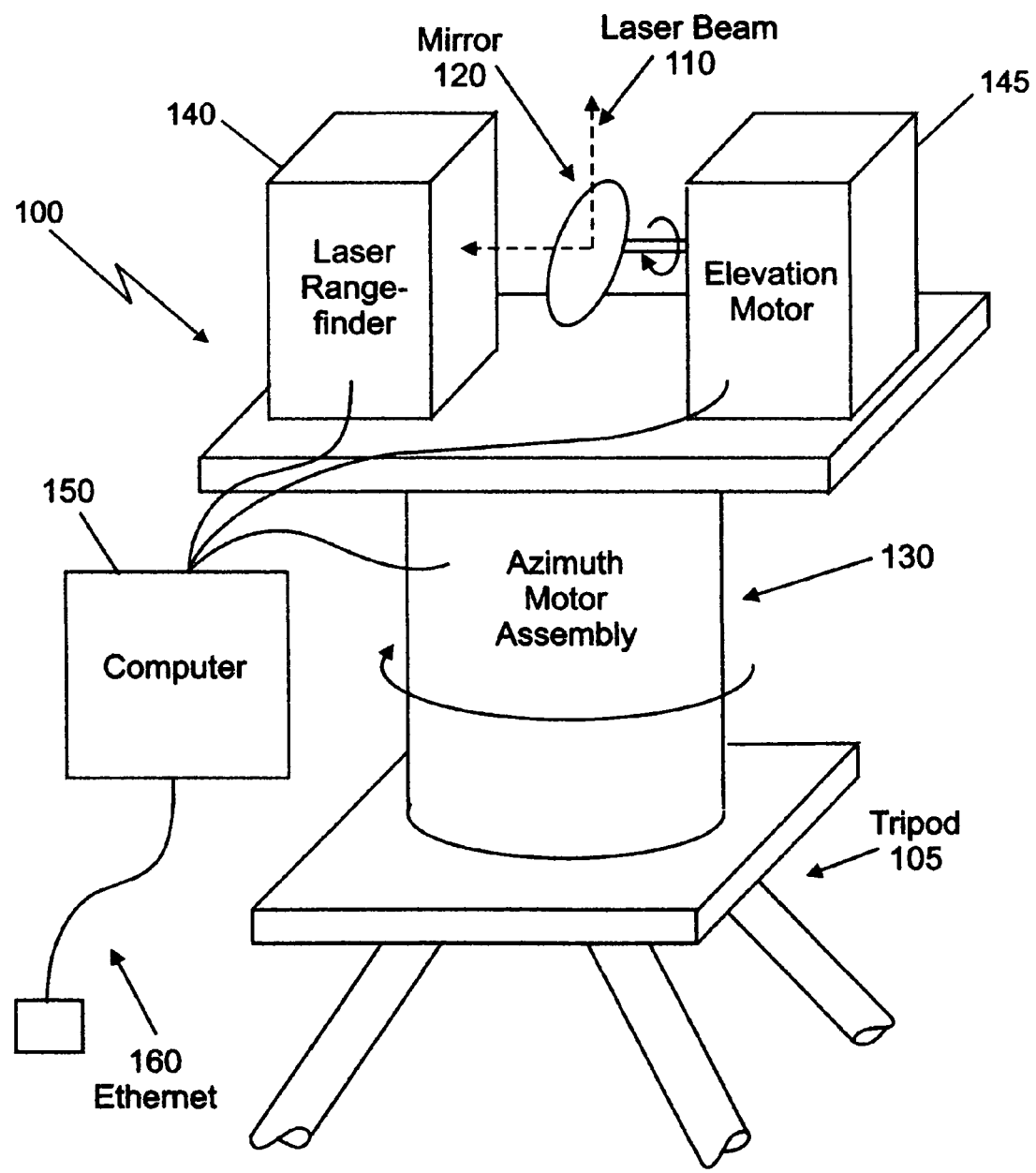
FIG. 1 is a diagram illustrating a conventional 3D scanning laser rangefinder.

The present invention now will be described more fully hereinafter with reference to the accompanying illustrative figures, in which various embodiments of the invention are shown. This invention may, however, be embodied in many different forms and should not be construed as limited to the embodiments set forth herein. Rather, these embodiments are provided so that this disclosure of the present invention will be thorough and complete, and will fully teach and describe the invention to those skilled in the art. Although specific terms are employed herein, they are used in a generic and descriptive sense only and not for purposes of limiting the scope of the present invention as defined by the attached claims in any way. Some terminology may be defined herein and used to describe forthcoming embodiments of the present invention, in order to teach the present invention to those skilled in the art. Terms not described explicitly in this disclosure should be construed as they would by those skilled in the art. Unless otherwise expressly limited, all terms used herein including technical and scientific terms, whether defined herein or not, are intended to have the broadest possible meaning as understood by one of ordinary skill in the art. It will be further understood that terms not explicitly defined herein should be interpreted as having the broadest possible meaning or meanings found in commonly used dictionaries, consistent with their meaning in the context of the relevant art. Some terms will be explicitly defined herein and used to describe embodiments of the present invention to those skilled in the art. Terms defined explicitly herein should be interpreted as the broader of their definition herein and their dictionary meanings. These defined terms should accordingly be construed according to their broadest possible meaning to skilled artisans in this field.

The Figures are provided for illustrative purposes for teaching purposes and to assist in understanding the present invention, and should not be viewed as precision blueprints or perfectly scaled drawings. In the drawings provided, the dimensions of features or regions may be exaggerated for clarity, readability, or the like. Features in the Figures may not be exactly to scale. The Figures are provided to show example embodiments of the present invention. Thus, embodiments of the present invention should not be construed as limited solely to the particular Figure or Figures illustrated herein but may include variations and deviations from many sources. Like numbers refer to like features or elements throughout. As used herein the term "and/or" includes any and all combinations of one or more of the associated listed items. Further, as used herein the term "at least" includes the number specified plus more than the number specified, unless explicitly limited otherwise.

As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, and/or components, but do not preclude the presence of one or more additional features, steps, operations, elements, components, and/or combinations thereof. Moreover, terms such as "horizontal", "vertical" and "perpendicular" indicate general directions or relationships rather than precise 0° or 90° orientations. Ranges and angles are approximate and are provided merely to teach the invention.

In one embodiment, the present invention provides a method for displaying a 2D image data set obtained using a 2D imaging device combined with a 3D range data set obtained using a 3D rangefinder device. First, the method includes the step of providing a 3D range data set. At least one 2D image data set is provided which differs from the 3D range data set in at least one of resolution, origin, and both resolution and origin. The 3D range data set can be represented as a first displayed image, while the at least one 2D image data set may be represented as at least a second displayed image. The method further identifies corresponding features within the first displayed image and within at least one second displayed image respectively. Thereafter, a 3D transformation between the 3D range data set and the at least one 2D image data set is computed based on the geometry of the specified corresponding features. As such, the geometric correspondence between the 3D range data set and at least one 2D image data set may be determined. The at least one 2D image data set can be represented as a third displayed image wherein a 3D coordinate can be computed for any specified pixel of the at least one 2D image data set based on the previously computed 3D transformation and the 3D range data set. Various other embodiments related to the preceding embodiment are provided.

In some embodiments, the step of representing the at least one 2D image data set as the third displayed image may comprise two steps. First, at least part of the 3D range data is represented as 3D surfaces. Next, at least one 2D image can be represented as texture maps on at least part of the 3D surfaces according to the previously computed 3D transformation. For a number of embodiments, the step of representing the at least one 2D image data set as the third displayed image may further comprise two steps. For instance, the step may comprise representing the 3D range data set as a fourth displayed image wherein a hot spot area associated with all or some of the at least one 2D image data set is indicated by highlighting therein, selecting the hot spot area interactively, and thereafter representing the at least one 2D image data set associated with the selected hot spot area as the third displayed image.

The displayed image can comprise a 3D image. There are various possibilities for the 3D image. For example, a 3D point display, a 3D point display in orthogonal projection, or a 3D point display in perspective projection could comprise a 3D image. Further, a 3D polygonal mesh, a 3D polygonal mesh in orthogonal projection, or a 3D polygonal mesh in perspective projection could be used. Also, a 3D image could comprise a 3D surface geometry display, a 3D surface geometry display in orthogonal projection, or a 3D surface geometry display in perspective projection. Other 3D images are possible as well.

Embodiments of the method can further comprise additional steps as well. For instance, the method may include the steps of identifying at least a first feature within the third displayed image; identifying at least a second feature within one of the first displayed image, the second displayed image, and the third displayed image; computing a 3D coordinate for at least the first feature based on the at least one 2D image data set, the previously computed 3D transformation, and the 3D range data set; and thereafter computing 3D coordinates for at least the second feature. Identifying features can be performed in many different ways. For example, identifying can be by using a computer cursor controlled by a mouse to identify, using a computer cursor controlled by a pointing stick to identify, using a computer cursor controlled by a joystick to identify, using a computer cursor controlled by a touch pad to identify, using software to identify, or the like. Of course, identifying features can be done by using combinations of the above means of identifying. Further, identifying features may comprise a variety of techniques. As some examples, identifying features may include using sub-pixel interpolation in any 2D displayed image wherein a software tool may allow the user to estimate and specify the location of a feature anywhere within a pixel and not just at its origin, or using interpolation between measured 3D range data points on surfaces in any 3D displayed image wherein a software tool may allow the user to estimate and specify the location of a feature anywhere upon a surface even if that particular location is not directly associated with a measured 3D range data point. In addition, identifying features could comprise using estimates of the centers of features wherein the user may estimate and specify the location of the center of a feature even if the particular pixel at that chosen center appears no different from adjacent pixels, or using holes and data interpolated across holes wherein the rangefinder device did not acquire a range measurement and wherein a software tool may allow the user to estimate and specify the location of a feature anywhere within a hole even though that particular location is not directly associated with a measured 3D range data point.

Regardless of how features are identified, at least some method embodiments can comprise the step of displaying the computed measurement. The step of displaying can represent displaying at least a measurement point displayed, or a plurality of measurement points displayed. Further, a measurement line, a plurality of measurement lines, a measurement surface, a plurality of measurement surfaces, a measurement volume, and a plurality of measurement volumes can be displayed. In addition, displaying could comprise a measurement feature display, a plurality of measurement features displayed, or combinations of the above displays.

Embodiments of the method may provide one or more 2D image data sets. 2D image data sets can be provided from a number of sources. For example, a 2D image data set can be provided from a color digital still camera, a monochrome digital still camera, a color digital video camera, or a monochrome digital video camera. Also, a color analog video camera with digital conversion, a monochrome analog video camera with digital conversion, a color film camera with the film or print made from the film subsequently being digitized for use as a 2D image data set, a monochrome film camera with the film or print made from the film subsequently being digitized for use as a 2D image data set, a color digital line scan camera, a monochrome digital line scan camera, or a color digital panoramic scanning camera can provide the 2D image data set. Further, a monochrome digital panoramic scanning camera, another device that acquires a multiplicity of image data points simultaneously, another device that acquires a multiplicity of image data points over a period of time, and combinations of the preceding could also be used.

Various method embodiments provide a 3D range data set. 3D range data sets can be provided from many devices and sources, such as a 3D rangefinder device. A scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, and an imaging laser rangefinder range camera using phase comparison range measurement principles could all provide a 3D range data set. Further, an imaging laser rangefinder range camera using any other range measurement principles, a triangulation rangefinder, a stereo image rangefinder, a multiple image rangefinder, any other device that acquires a multiplicity of range data points simultaneously, or any other device that acquires a multiplicity of range data points over a period of time and combinations of the above could be used as the source of a 3D range data set. The 3D range data set can be represented by at least two displayed images in some embodiments.

In some cases and embodiments, the method can further comprise the step of providing at least a second 3D range data set. Thereafter, the method may also comprise representing the at least second 3D range data set as at least a fourth displayed image. Next, corresponding features within the fourth displayed image and within the second displayed image can be identified respectively. Further, a 3D transformation between the at least second 3D range data set and the at least one 2D image data set may be computed based on the geometry of the specified corresponding features. As such, the geometric correspondence between the at least second 3D range data set and the at least one 2D image data set can be determined.

For some method embodiments, the step of representing at least one 2D image data set as a third displayed image might comprise the step of representing the at least one 2D image data set as a third displayed image wherein a 3D coordinate can be computed for any specified pixel of the at least one 2D image data set based on the previously computed 3D transformation and at least one of the first 3D range data set and the second 3D range data set.

At least some embodiments of the method require a 2D image. Again, various types of 2D images can be used. For instance, a 2D range image comprising range values from the 3D rangefinder device converted to monochrome, a 2D range image comprising range values from the 3D rangefinder device converted to false color, or a 2D reflectance image comprising intensity values of the rangefinding signal reflected from a physical surface and thereafter received by the 3D rangefinder device converted to monochrome can represent a 2D image. In addition, a 2D reflectance image comprising intensity values of the rangefinding signal reflected from a physical surface and thereafter received by the 3D rangefinder device converted to false color, a 2D registered color image comprising a color camera image previously registered with 3D range data, or a 2D registered color image wherein the image is acquired from the same perspective as the 3D range data set could be a 2D image. Further, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, or a 2D image displayed in spherical projection format could be used. A 2D image displayed in any other 3D-to-2D projection format, or a 2D registered monochrome image comprising a monochrome camera image previously registered with 3D range data can also represent a 2D image as used herein.

Those skilled in the art will appreciate that the method embodiments can be implemented in any number of ways. The method could be implemented in a computer processor executing a suitable computer software program product executing therein. Further, the method may be implemented in a suitable computer software program product embodied on computer readable tangible media.

The present invention provides other embodiments. For instance, one embodiment of the invention provides a computer program product stored in computer readable media for execution in at least one processor for displaying a 2D image data set obtained using a 2D imaging device combined with a 3D range data set obtained using a 3D rangefinder device. A number of software modules comprise this embodiment. A first software module for providing a first 3D range data set is included. Further, the embodiment provides a second software module for providing at least one 2D image data set which differs from the 3D range data set in at least one of resolution, origin, or both resolution and origin. A third software module for representing the 3D range data set as a first displayed image is provided. In addition, a fourth software module for representing the at least one 2D image data set as at least a second displayed image is included therein. The embodiment provides a fifth software module for identifying corresponding features within the first displayed image and within at least one second displayed image respectively. A sixth software module is provided for computing a 3D transformation between the 3D range data set and the at least one 2D image data set based on the geometry of the specified corresponding features. As such, the geometric correspondence between the 3D range data set and at least one 2D image data set may be determined. Further, a seventh software module for representing the at least one 2D image data set as a third displayed image is provided. Thus, a 3D coordinate can be computed for any specified pixel of the at least one 2D image data set based on the previously computed 3D transformation and the 3D range data set. The present invention also provides other embodiments related to the preceding, and the prior discussion related to the method embodiments applies also to the computer program product embodiments.

The present invention provides an apparatus in yet another embodiment. The apparatus may be used for displaying a 2D image data set obtained using a 2D imaging device combined with a 3D range data set obtained using a 3D rangefinder device. The apparatus includes at least one computer processor therein, and a computer program product executing within the at least one computer processor. As such, a first software module for providing a first 3D range data set is provided. A second software module for providing at least one 2D image data set which differs from the 3D range data set in at least one of resolution, origin, and both resolution and origin is included. Further, the embodiment provides a third software module for representing the 3D range data set as a first displayed image. A fourth software module for representing the at least one 2D image data set as at least a second displayed image is provided. In addition, a fifth software module is included for identifying corresponding features within the first displayed image and within at least one second displayed image respectively. A sixth software module for computing a 3D transformation between the 3D range data set and the at least one 2D image data set based on the geometry of the specified corresponding features is provided. As such, the geometric correspondence between the 3D range data set and at least one 2D image data set can be determined. In addition, the embodiment provides a seventh software module for representing the at least one 2D image data set as a third displayed image. Thus, a 3D coordinate can be computed for any specified pixel of the at least one 2D image data set based on the previously computed 3D transformation and the 3D range data set. The present invention also provides other embodiments related to the preceding. Further, the prior discussion related to the method embodiments applies also to the apparatus embodiments. Next we discuss more details regarding various embodiments of the present invention.

Figure 4:
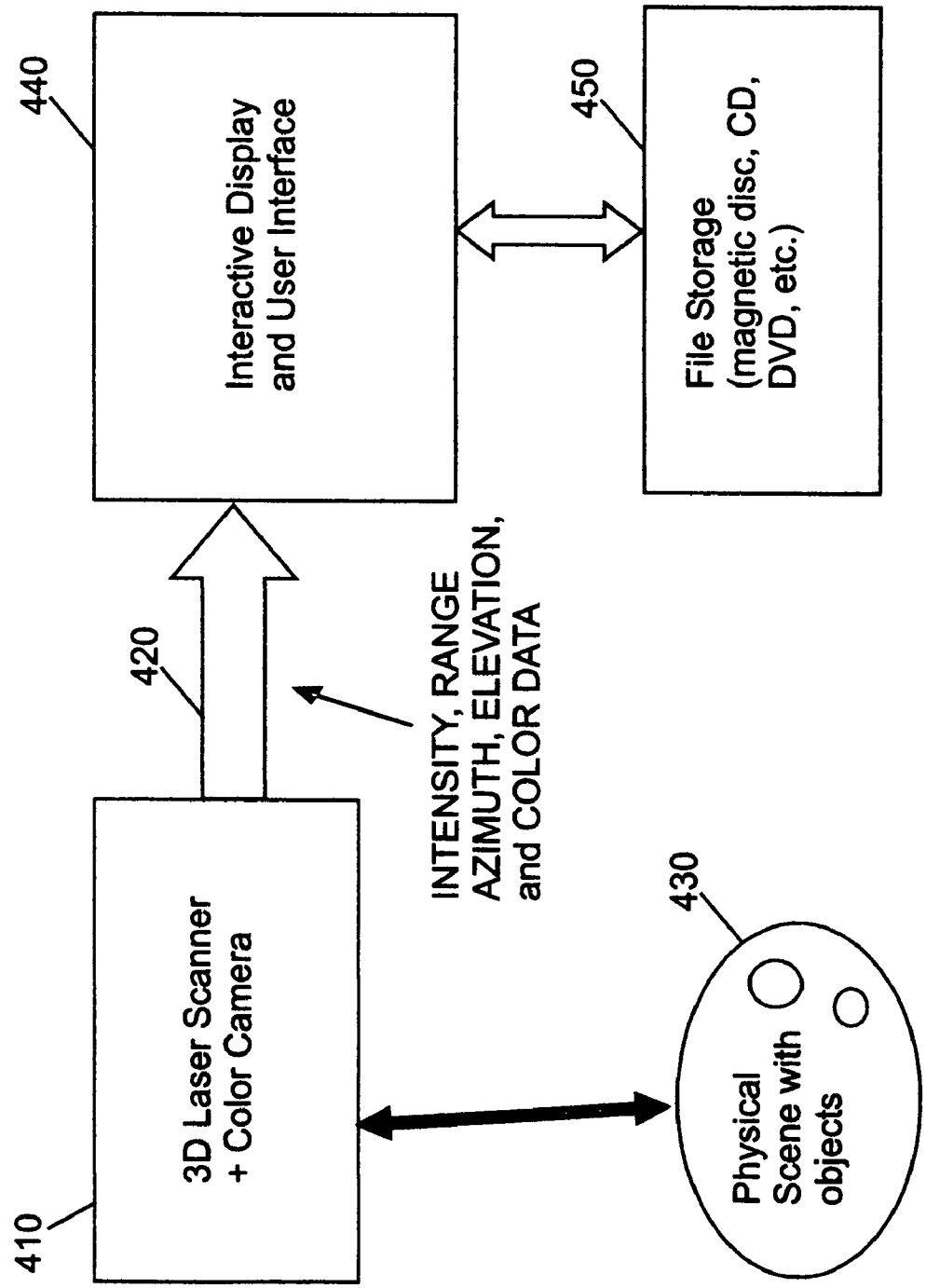
FIG. 4 is a diagram illustrating one example of the acquisition of a 3D range data set.

Referring to FIG. 4, a 3D rangefinder 410 is used to acquire a 3D range data set 420 from a physical object or scene 430. One 3D rangefinder 410 embodiment shown in FIG. 1 is a laser scanning 3D rangefinder 100 comprising a time-of-flight laser rangefinder 140, elevation scanning mirror 120 which is rotated by elevation motor 145, and azimuth rotating motor assembly 130. The 3D rangefinder such as shown in FIG. 1 also includes an embedded computer 150 for interfacing to and controlling the rangefinder 140, elevation motor 145, and azimuth motor 130. The embedded computer 150 communicates with any external computer via Ethernet 160 and also transfers data samples from the rangefinder, performs necessary data processing such as applying calibration tables, and passes data samples to the external computer for visualization, storage, and subsequent processing.

We see that in FIG. 4, the 3D range data set 420 for each data sample comprising intensity, range, azimuth, and elevation values is transferred to an external computer and presented in a computer display 440 for evaluation and control of laser scanning parameters such as resolution and speed. The data is simultaneously stored in a computer file 450 for later processing and display.

In some instances, a single 3D range data set 450 will be sufficient to represent the physical scene or objects of interest 430.

In other instances, two or more 3D range data sets such as 450 are typically acquired using the laser scanning 3D rangefinder 410 located at different locations around the scene. Other techniques for acquiring multiple 3D data sets 450 may be used including using the same rangefinder 410 at different times or at different resolutions and using two or more different 3D rangefinders 410. The operator or user must take care that there is some area of the scene that is overlapped by two or more acquisition scans so that a subsequent registration step may be readily performed.

After acquisition of two or more 3D range data sets 450 from a physical scene such as 430 with objects, a further step of registering the multiple data sets must be carried out. Typically, each data set to be registered is presented to a user via a computer display as a 3D set of points and the user then performs the step of identifying corresponding features within the 3D images representing the multiple data sets.

For example, the user might use a mouse or other control device to position a cursor such as a crosshairs over a desired pixel within a 3D displayed image. The corresponding X, Y, and Z values for that pixel are known, having been used to create the displayed pixel using well-known 3D computer graphics techniques. The user next proceeds to select as many pairs of features as desired as input to the next step of calculating the 3D transformation between two range data sets.

A minimum of three non-collinear pairs of corresponding 3D (X, Y, Z) points is needed to calculate the desired 3D rigid transformation using well-known techniques to solve for 3 rotation angles plus 3 translations, including those disclosed for example in O. D. Faugeras and M. Hebert "The representation, recognition, and locating of 3-d objects", International Journal of Robotic Research, 5(3):27-52, Fall 1986. More points may be used along with well-known least-squares minimization techniques to obtain a better fit, as disclosed for example in K. Arun, T. Huang, and S. Blostein, "Least-Squares Fitting of Two 3D Point Sets", in IEEE Transactions on Pattern Analysis and Machine Intelligence, vol. 9 (1987), 698-700. Also the initial sets of corresponding features may be used as the starting points for algorithms such as the iterated closest point technique disclosed in P. J. Besl and N. D. McKay, "A Method for Registration of 3-D Shapes", IEEE Transactions on Pattern Analysis and Machine Intelligence, Vol. 14 (1992), No. 2, 239-256. Additional references to registration techniques which might be used are given in Fausto Bernardini and Holly Rushmeier, "The 3D Model Acquisition Pipeline" Volume 21 (2002), number 2 pp. 149-172 COMPUTER GRAPHICS forum.

Having accomplished the step of registering two or more 3D data sets by computing the 3D transformation between them, the user can next merge all the 3D data sets into one combined 3D data set and display that combined 3D data set. Either a single original 3D data set or a 3D data set which is the combination of multiple 3D data sets may now be displayed in preparation for the further step of creating a display incorporating high resolution 2D image data.

Figure 5:
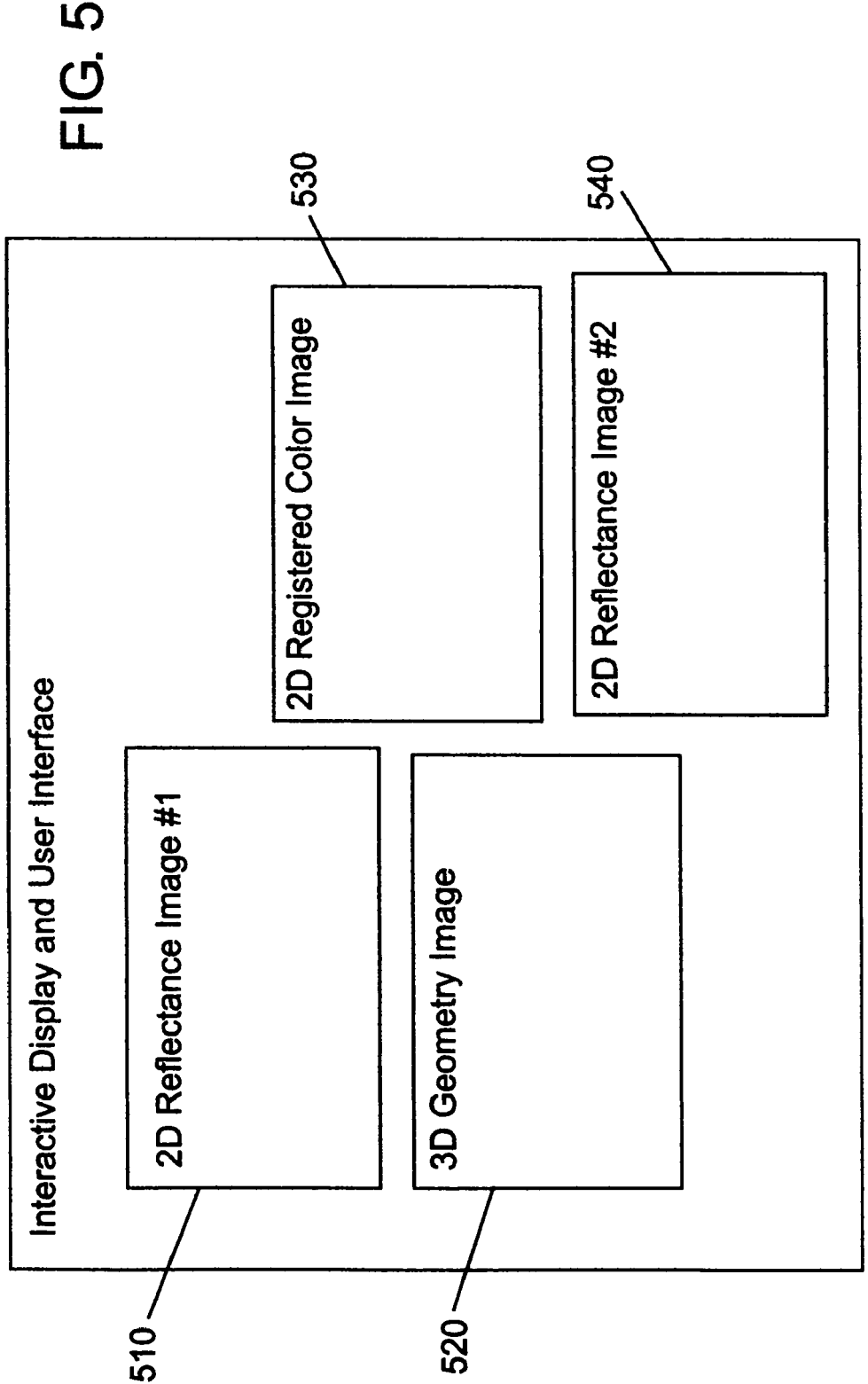
FIG. 5 is a diagram illustrating an example display of multiple images representing a 3D range data set, according to some embodiments of the present invention.

Next the 3D data set to be used is presented to a user via a computer display. The user may select from multiple formats which may be used for displaying this data as shown in FIG. 5. As an example, data from a 3D data set is represented in window 510, representing a 2D Reflectance Image for example, and window 520, representing a 3D geometric image on the display screen while data from a 3D data set is represented in windows 530 and 540 on the display screen. Window 540 may represent 2D Reflectance Image #2, and window 530 can represent a 2D Registered Color Image, for example.

A 3D displayed image format such as 520 is one in which the user may select a particular 3D viewpoint and then view the 3D range data as geometric figures in perspective projection or in orthogonal projection or via some other projection. Techniques for displaying collections of 3D data are well known from computer graphics textbooks such as "Computer Graphics: Principles and Practice in C" by James D. Foley, Andries van Dam, Steven K. Feiner, and John F. Hughes (Addison Wesley 1995). The display may represent range data samples as 3D points, also known as a point cloud, which may all be colored a single color, which may have false color assigned to each point based on its range, which may have color assigned to each point based on the intensity of the reflected laser beam, or colored via any other scheme. In another 3D display technique, the 3D range data points may be linked together into a displayed mesh using well known computer graphics techniques, such that neighboring points are connected via lines within the display. The lines of the mesh may be colored using any of the techniques discussed above using well-known computer graphics techniques. For a further 3D display technique, the 3D range data points may be linked together into a surface using well known computer graphics techniques. The surface may have range values interpolated between actual data points using linear, quadratic, cubic, or any well-known surface interpolation technique. The color of the surface at each displayed pixel may determined in any of a number of well-known ways, including computing simulated lighting effects based on the orientation of the interpolated surface, interpolating reflectance intensity values measured at each data point, mapping a 2D image or any other function to the 3D surface using well-known texture-mapping techniques, combinations thereof, or any using other well-known techniques for surface rendering.

Figure 2:
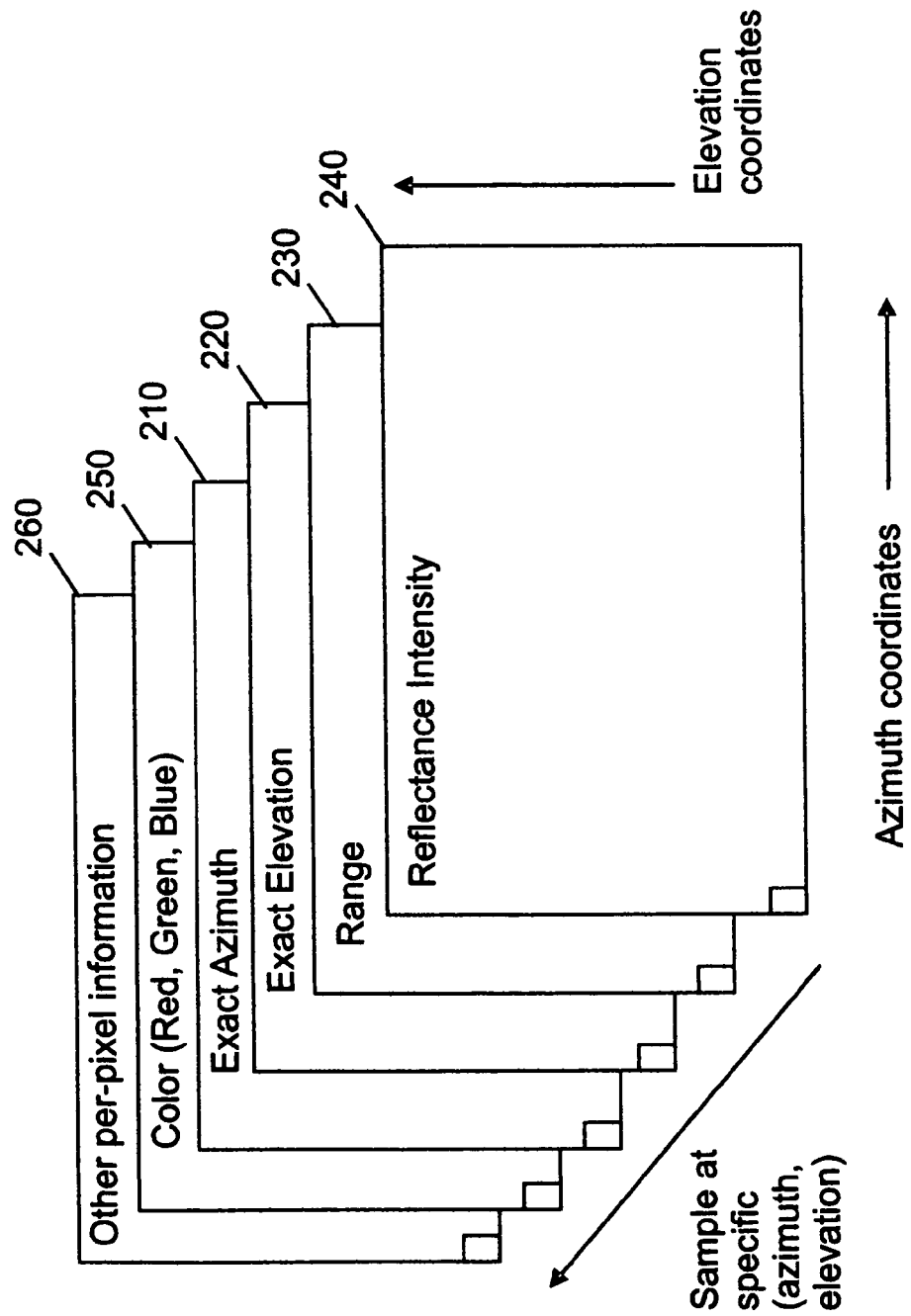
FIG. 2 is a diagram illustrating multiple example values that could be associated with a pixel within a 2D image representing a 3D range data set.
Figure 3:
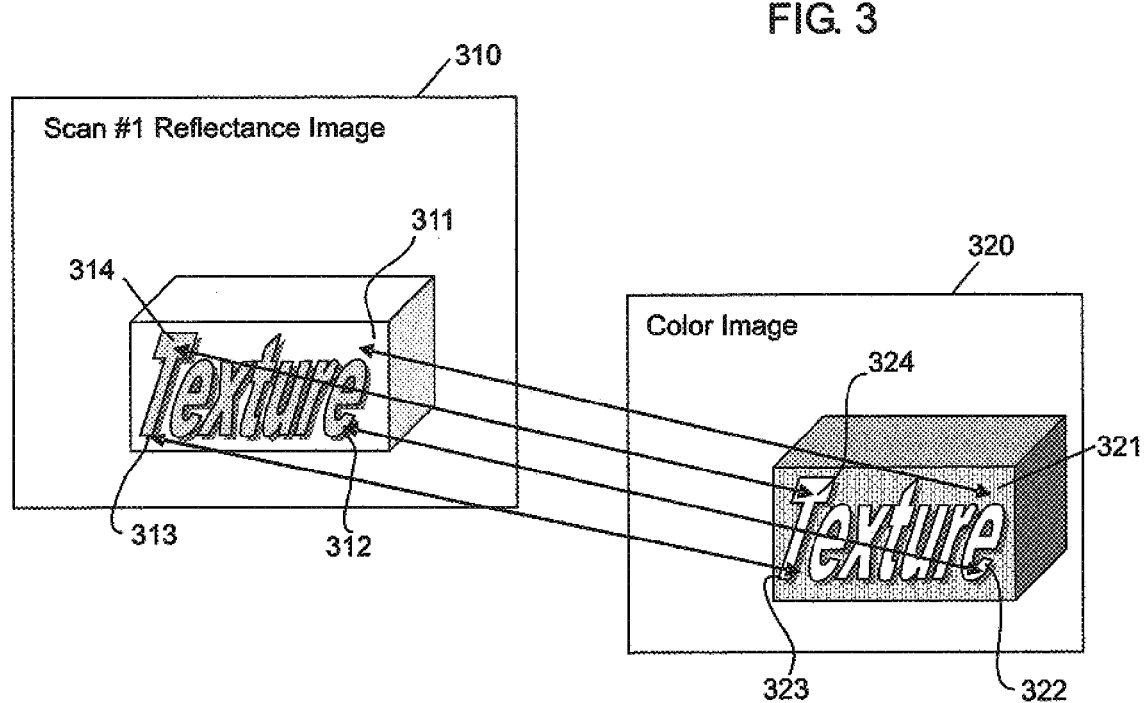
FIG. 3 is a diagram illustrating corresponding range and color information for a registered color image representing a 3D range data set.

A 2D displayed image format such as 510, 530, or 540 is one in which the 3D data set is represented as a 2D image. There are many well-known techniques for doing this since the data from typical 3D rangefinder is obtained by scanning in two dimensions, typically azimuth and elevation. The resulting data can naturally be represented as a 2D image in spherical projection, where the azimuth angle of a 3D sample is represented as the horizontal or X axis and the elevation angle is represented as vertical or Y axis on the display, and each pixel represents one or more 3D data points depending on the scale chosen. The 2D displayed image need not be represented in spherical projection, but in any other well-known projection of a 3D data set to a 2D display. As illustrated in FIG. 2, each pixel may have a multiplicity of associated values stored with it, including precise azimuth angle value 210, precise elevation angle value 220, range value 230, reflectance value 240, color 250 (RGB), and any other useful values 260. The color of each pixel with in the 2D displayed image may be determined in any of a number of well-known formats. A Range Image has a false color assigned to each pixel based on its range. A Reflectance Image such as 510 or 540 has a color assigned to each pixel based on the intensity of the reflected laser beam. A Registered Color Image such as 530 has a color assigned to each pixel based on the color obtained from a color sensor such as a 2D digital camera such that the range data and color data are aligned as shown in FIG. 3. In this case the resolution of the image is the same as the resolution of the 3D data set and this is referred to as a normal resolution registered color image.

To further create a high resolution image incorporated into the 3D data set, the next step is to acquire a 2D image with higher resolution than the 3D rangefinder resolution. This may be done using a calibrated color camera with inherently higher spatial resolution than the 3D rangefinder. This may also be done by acquiring a 2D image from a viewpoint other than the 3D rangefinder viewpoint. For example, the color camera may be moved closer to an object so that higher resolution is obtained. The camera viewpoint need not be from the same angle as the 3D rangefinder. Alternatively, a different lens or a zoom lens may be used to obtain a narrower field of view and correspondingly higher resolution, with the 2D image taken either from the 3D rangefinder viewpoint or another viewpoint.

Figure 6:
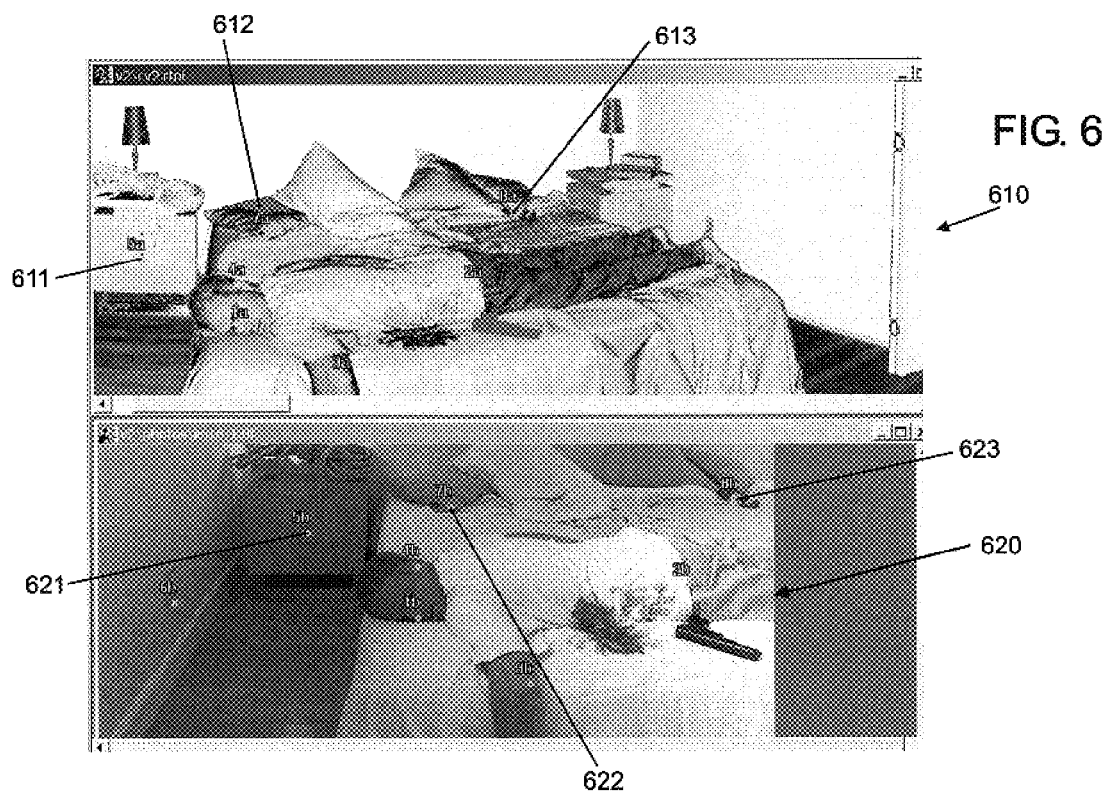
FIG. 6 is a diagram illustrating a reflectance image representing a 3D data set in one window and a 2D color image obtained from the same perspective in another window, according to some embodiments of the present invention.

The next step is to register the new 2D image with the corresponding 3D range data. This may involve interactive specification of corresponding points in the 2D image and in the 3D range data as shown in FIG. 3 and FIG. 6. Corresponding points may be interactively specified with a device such as a mouse or joystick controlling a cursor or other indicator on a computer display. For example, the user might view the color image in one window and in an adjacent window might view the 3D range data as a reflectance image (where pixel intensity indicates the reflected laser rangefinder intensity). Techniques for such registration are well known, having been available in the dsColor and other software packages from DeltaSphere for some time, for example. Registration may also involve semi-automatic techniques such as interactive manual identification of an initial feature point position estimate followed by automatic position refinement or fully automatic techniques for establishing point-to-point correspondence, based on interactive or automatic identification of corresponding feature points such as edges, centers, etc. Again, there are well-known techniques for performing such semi-automatic and automatic registration.

In the next step, the corresponding points or features are then used to determine a 3D transformation between the 2D camera viewpoint and the 3D rangefinder viewpoint. Techniques for determining such a transformation from multiple corresponding points are well known.

Finally, the 3D transformation between the 2D camera viewpoint and the 3D rangefinder viewpoint is used in the display of high resolution imagery incorporated into the display of 3D data sets captured by a 3D rangefinder. The present invention includes two main forms of display, the 3D Inset Display Method and the 2D Hot Spot Display Method.

In the 3D Inset Display Method, the normal texture map references within a 3D geometry display are replaced by new references to the high-resolution imagery. That is, the new high-resolution texture display replaces the old normal-resolution texture display. The area of substitution is typically interactively specified and software is used to substitute the new texture map coordinates in the 3D surface data based on the 3D transformation between geometry and image viewpoints that was computed in the previous step. The result is an inset of high-resolution texture. Of course, the area of inset could even be extended to cover the entire 3D data set if enough high-resolution imagery was available. Sometimes this complete coverage is not desirable, because the display hardware will become overloaded by too much texture data.

Because the 3D relationship between the high-resolution 3D Inset and the 3D range data has been determined, it is possible to interrogate a pixel in the displayed high-resolution image and obtain the corresponding 3D coordinates within the 3D space captured by the 3D rangefinder. For example, the user can interactively specify measurement points using a mouse or joystick to position a cursor or box or the like. Since the underlying 3D coordinates in that 3D data set's coordinate frame for each displayed point can be readily calculated from the measured range, azimuth, and elevation of the point, the calculation of any measurement is straightforward. Because the 2D image is at higher resolution than the 3D data, it is usually necessary to interpolate the 3D data. For example, interpolation from a simplified surface model or from the original unsimplified 3D data set acquired by the 3D rangefinder may be needed. This interpolation may use linear, bi-linear, bi-cubic, spline, or any other commonly known technique.

Various versions of the 3D Inset Display Method are possible, including automatic or manual switching or blending between normal-resolution and high-resolution texture display as the user's 3D viewpoint zooms into an area. In addition, multiple levels of resolution from multiple independent 2D images may be combined with automatic or manually selected switching or blending.

In the 2D Hot Spot Display Method, an area covered by a high-resolution 2D image is typically indicated by an outline or shaded area within the normal-resolution 3D geometry view or other view of the scene. The viewer can click on this Hot Spot and a new window will appear on the display, containing what appears to be a simple high-resolution 2D image. However, this is not a simple color image, but contains color data that has been registered with the corresponding 3D range data, as has been discussed earlier.

Because the 3D relationship between the 2D Hot Spot high-resolution image and the 3D range data has been determined, it is possible to interrogate a pixel in this image and obtain the corresponding 3D coordinates within the 3D space captured by the 3D rangefinder. For example, the user can interactively specify measurement points using a mouse or joystick to position a cursor or box or the like. Since the underlying 3D coordinates in the 3D rangefinder's coordinate frame for each displayed point can be readily calculated from the measured range, azimuth, and elevation of the point, the calculation of any measurement is straightforward. Because the 2D image is at higher resolution than the 3D range data, it is usually necessary to interpolate the 3D data. For example, interpolation from a simplified triangular model or from the original unsimplified 3D data set acquired by the 3D rangefinder may be needed. This interpolation may be linear, bi-linear, bi-cubic, spline, or use any commonly known technique.

Various versions of the 2D Hot Spot Display Method are possible, including automatic or manual switching or blending between low-resolution and high-resolution images as the user clicks on an area. In addition, multiple levels of resolution from multiple independent 2D images may be combined with automatic or manually selected switching or blending.

In either type of display, the ability to interrogate a high-resolution pixel and obtain its 3D coordinates is extremely useful. Interactive or automated measurements such as length, area, etc. can then be made within a high-resolution area, or between multiple high-resolution areas, or between a high-resolution and a normal-resolution area. This is extremely beneficial in the case of close-up 2D images obtained within a crime scene, for example.

Furthermore, the high-resolution imagery need not necessarily be higher resolution conventional color (RGB) imagery, but might be obtained using some alternative imaging technique such as UV fluorescence or infrared emission or reflection. A key concept of embodiments of the present invention is registering the additional imagery with the 3D range data and then displaying the results in a fashion that provides new visualization, analysis, and measurement capability.

Embodiments of the present invention specifically cover taking measurements within a single 2D Hot Spot high-resolution image, a single 3D Inset high-resolution image, between two or more high-resolution images of either type, and between a high-resolution image of either type and a normal-resolution image of any type. If the 3D transformation between two different displayed images is known, as is currently commonly developed from a separate operation of registering a 2D image to a 3D data set as in FIG. 3, then calculating the 3D distance between two measurement points identified in separate images is mathematically straightforward using well known techniques. For example, the second point can be transformed into the coordinate space of the first point and then the distance calculated within that coordinate space. It will be appreciated that the order of and number of transformations is immaterial, allowing measurements across multiple images.

It will also be appreciated that multiple measurement points may be specified and that any sort of measurement may be undertaken using this new technique, such as measuring distance, area, volume, diameter, etc., or fitting mathematical surfaces or structures such as planes, cylinders, or curved surfaces. Likewise, using well-known 3D computer graphics techniques, all or a portion of the measurement lines or figures may be drawn in each image as appropriate for that image.

Figure 20:
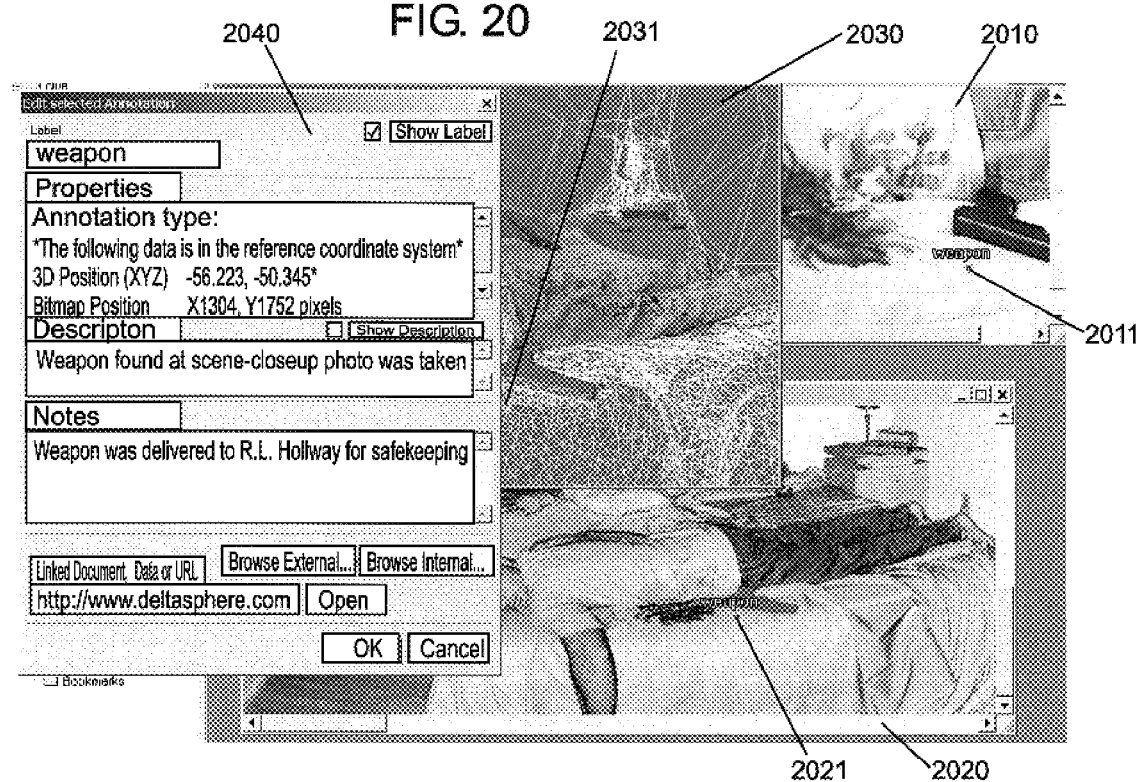
FIG. 20 is a diagram illustrating a high resolution registered color image, a reflectance image, and a 3D colored mesh display all representing the same 3D data set and showing specification of a landmark point, images thereof, and also showing an associated image containing additional information, according to some embodiments of the present invention

In addition to measurement points, a user may create an interactive landmark point or area that can then be selected to display additional information, such as text, links to images or other files, links to web sites, or the like. The ability to place landmarks on high-resolution 2D images and have them also be displayed in 2D or 3D as appropriate within other images is highly desirable. An example is shown in FIG. 20.

FIG. 6 illustrates aspects of embodiments of the present invention. FIG. 6 illustrates two display windows used in creating a representation of a 3D range data set of a simulated murder scene acquired by a 3D rangefinder and also incorporating high-resolution 2D image data. The top window 610 is a reflectance image and the bottom window 620 is a high resolution 2D image. Corresponding points in the two windows have been selected so that a registered color image can be created as discussed above. Some example corresponding point pairs are identified as 611 and 621, 612 and 622, and 613 and 623.

Figure 7:
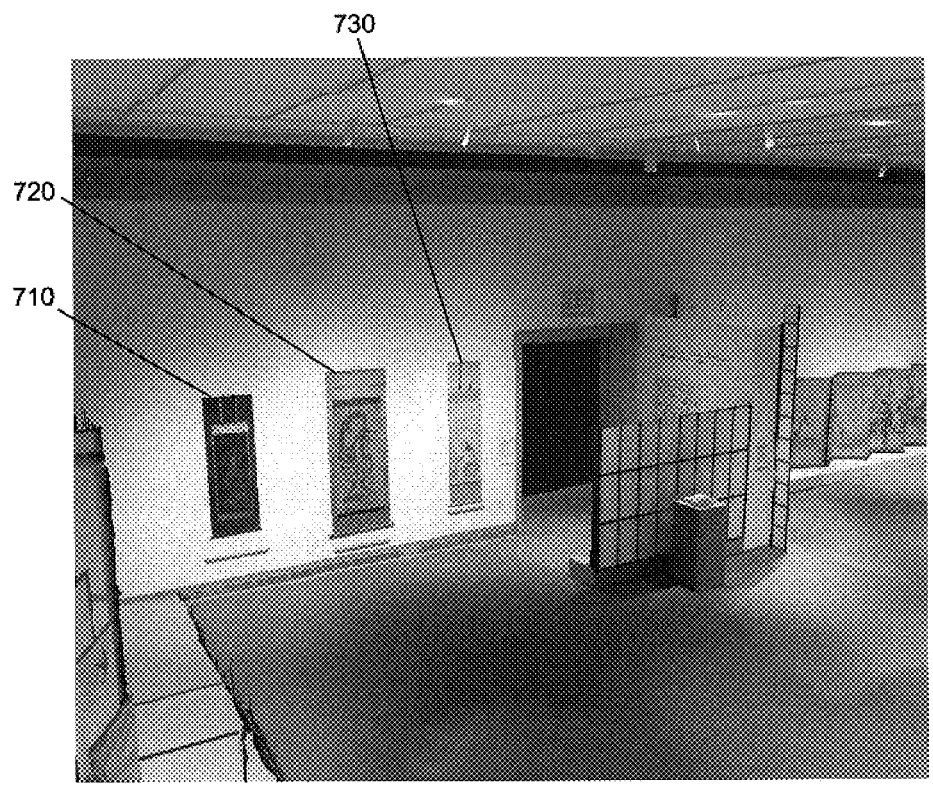
FIG. 7 is a diagram illustrating multiple high resolution color images incorporated into a 3D surface display of a 3D data set, according to some embodiments of the present invention.

FIG. 7 illustrates aspects of embodiments of the present invention. The 3D Inset Display Method is shown in a view of a normal resolution texture-mapped 3D surface display which has high-resolution insets of artwork such as 710, 720, and 730. The scene is displayed and may be viewed from any perspective using well-known 3D computer graphics techniques.

Figure 8:
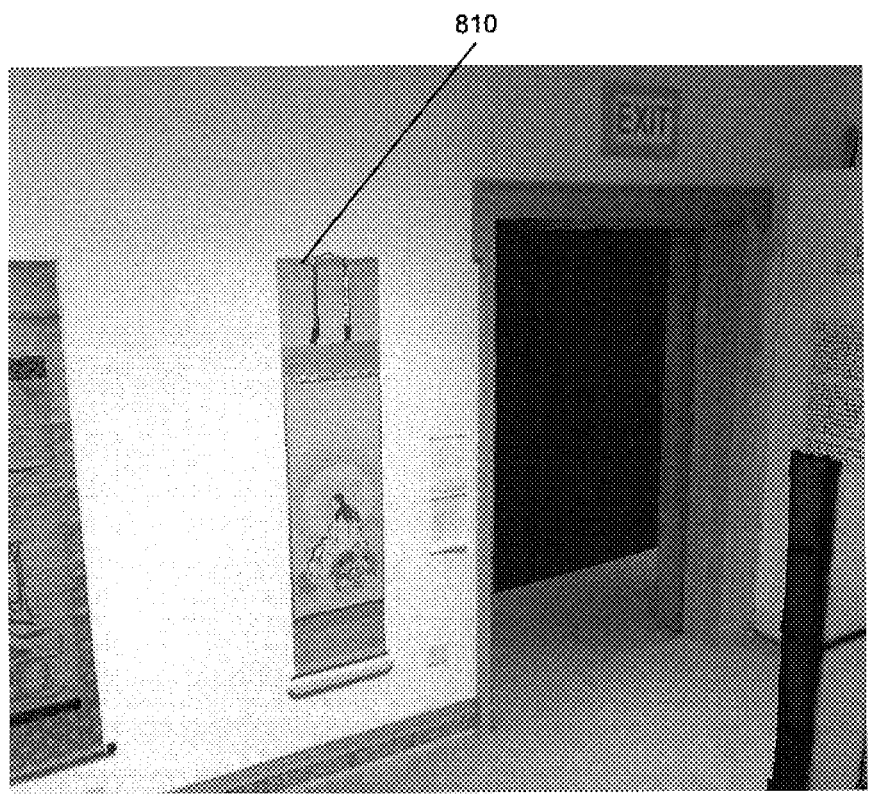
FIG. 8 is a diagram illustrating a high resolution color image incorporated into a 3D surface display of a 3D data set, according to some embodiments of the present invention.

FIG. 8 illustrates aspects of embodiments of the present invention. The 3D Inset Display Method is shown in a closer view of a normal resolution texture-mapped 3D surface display which has a high-resolution inset of artwork shown as 810. The scene is displayed and may be viewed from any perspective using well-known 3D computer graphics techniques.

Figure 9:
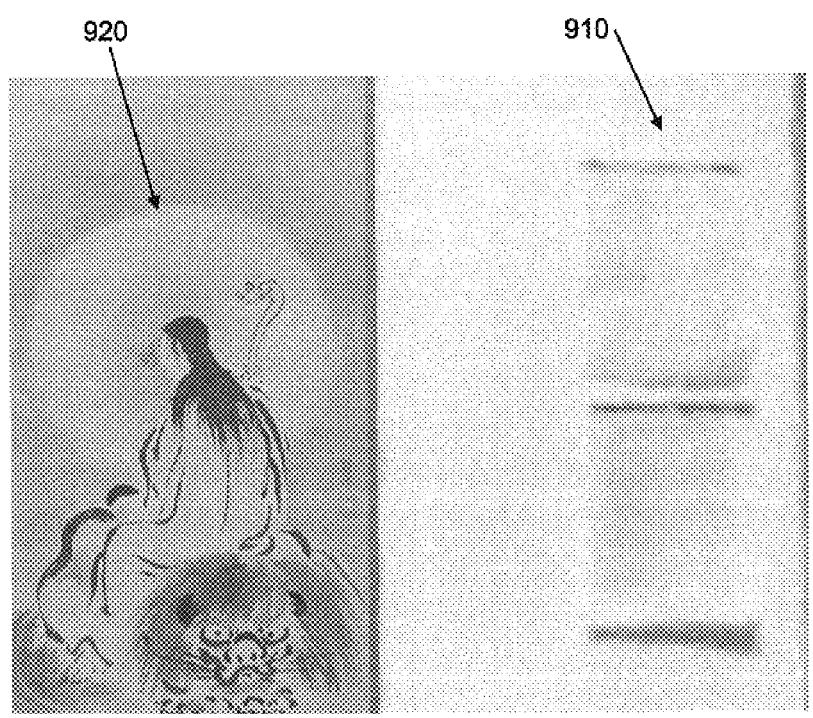
FIG. 9 is a diagram illustrating a close-up view of a high resolution color image incorporated into a 3D surface display of a 3D data set, according to some embodiments of the present invention.

FIG. 9 illustrates aspects of embodiments of the present invention. The 3D Inset Display Method is shown in a closer view of a normal resolution texture-mapped 3D surface display on the right at 910 and which has a high-resolution inset of artwork on the left shown as 920. The scene is displayed and may be viewed from any perspective using well-known 3D computer graphics techniques.

Figure 10:
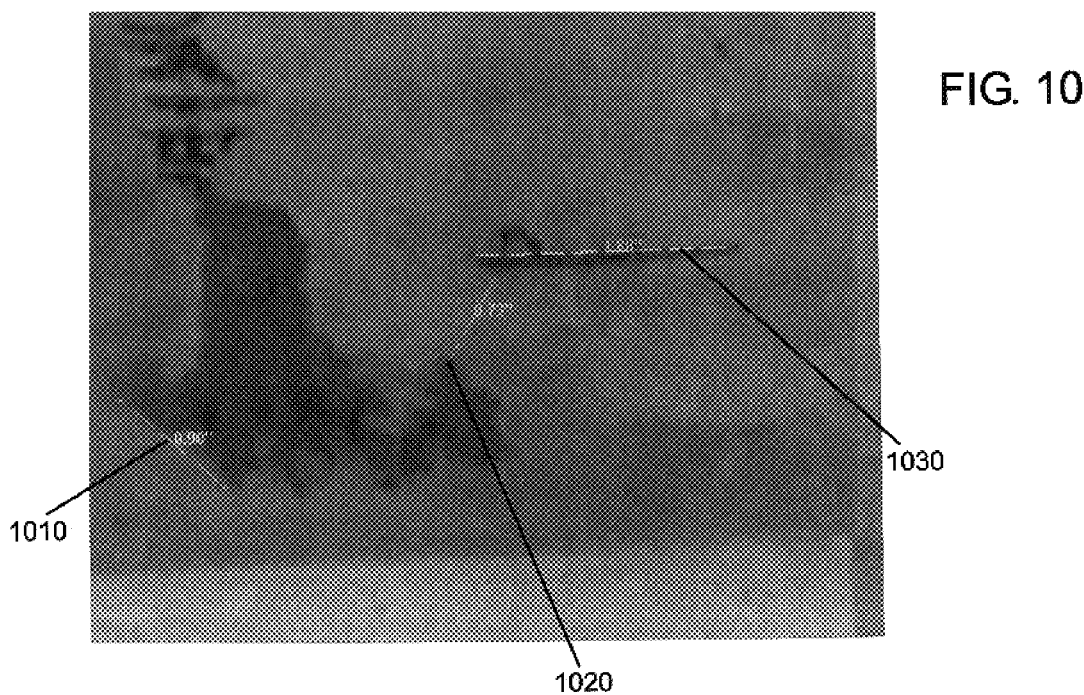
FIG. 10 is a diagram illustrating a close-up view of a high resolution color image incorporated into a 3D surface display of a 3D data set and showing measurement between two points and images thereof, according to some embodiments of the present invention.

FIG. 10 illustrates aspects of embodiments of the present invention. The 3D Inset Display Method is shown in a close-up view of a high-resolution inset of artwork inserted into a normal resolution texture-mapped 3D surface display. 3D measurements 1010, 1020, and 1030 have been made within the registered high-resolution inset texture. The scene is displayed and may be viewed from any perspective using well-known 3D computer graphics techniques.

Figure 11:
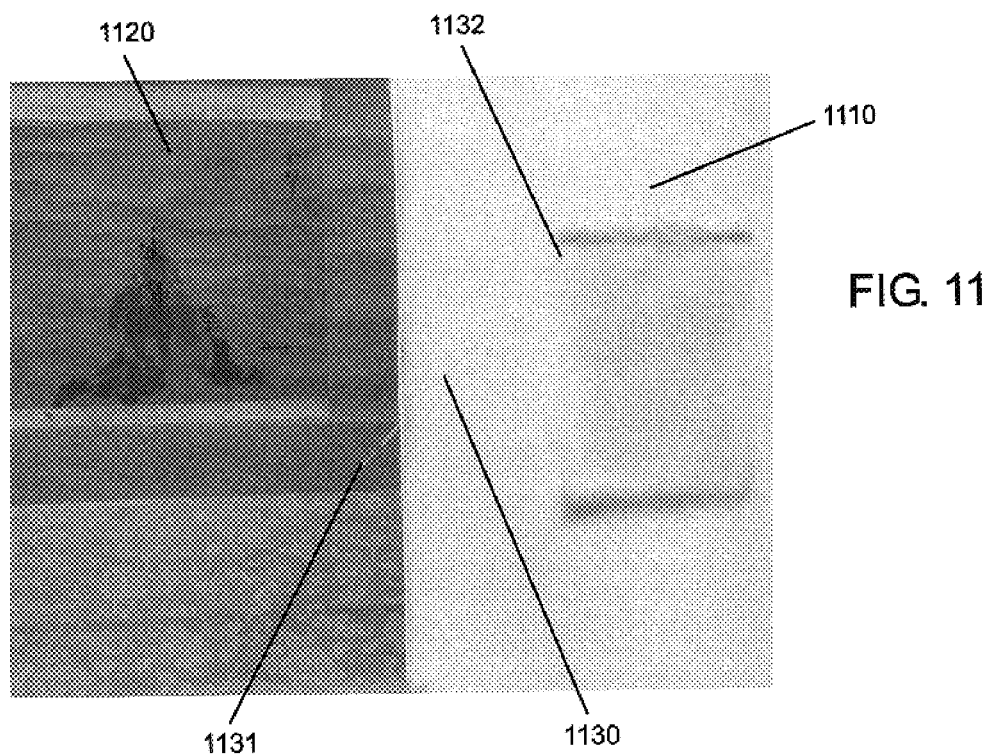
FIG. 11 is a diagram illustrating a close-up view of a high resolution color image incorporated into a 3D surface display of a 3D data set and showing measurement between two points and images thereof, according to some embodiments of the present invention.

FIG. 11 illustrates aspects of embodiments of the present invention. The 3D Inset Display Method is shown in a closer view of a normal resolution texture-mapped 3D surface display on the right at 1110 which has a high-resolution inset of artwork on the left shown as 1120. A 3D measurement 1130 has been made from a point 1131 within the registered high-resolution inset texture area 1120 to a point 1132 within the normal-resolution texture area 1110. The scene is displayed and may be viewed from any perspective using well-known 3D computer graphics techniques.

Figure 12:
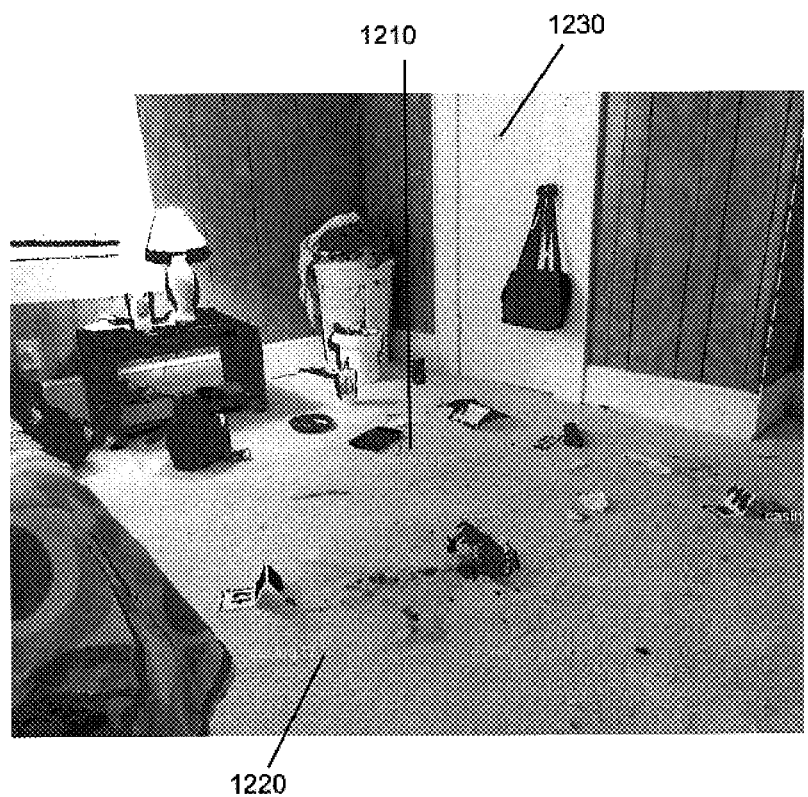
FIG. 12 is a diagram illustrating hot spots representing multiple high resolution color images incorporated into a 3D surface display of a 3D data set, according to some embodiments of the present invention.

FIG. 12 illustrates aspects of embodiments of the present invention. The 2D Hot Spot Display Method is shown in a 3D normal-resolution texture-mapped surface display overview of a crime scene. The 3D geometry viewpoint is approximately the same as the acquiring 3D rangefinder location. Two Hot Spot areas are outlined and identified as "videotape" 1210 and "casing 17" 1220. An additional Hot Spot area 1230 is outlined on the door. The scene is displayed and may be viewed from any perspective using well-known 3D computer graphics techniques.

Figure 13:
FIG. 13 is a diagram illustrating a high resolution registered color image corresponding to a hot spot which has been selected within a 3D surface display of a 3D data set, according to some embodiments of the present invention.

FIG. 13 illustrates aspects of embodiments of the present invention. The 2D Hot Spot Display Method has been used to show the registered high-resolution 2D image that is presented when the user selects the "casing 17" Hot Spot 1220 as illustrated in FIG. 12.

Figure 14:
FIG. 14 is a diagram illustrating a high resolution registered color image corresponding to a hot spot which has been selected within a 3D surface display of a 3D data set and showing measurement between two points and images thereof, according to some embodiments of the present invention.

FIG. 14 illustrates aspects of embodiments of the present invention. The 2D Hot Spot Display Method has been used to show the registered high-resolution 2D image that is presented when the user selects the "casing 17" Hot Spot 1220 as illustrated in FIG. 12. A 3D measurement 1410 has been made and displayed within a close-up view of the registered high-resolution 2D image represented by the "casing 17" Hot Spot 1220.

Figure 15:
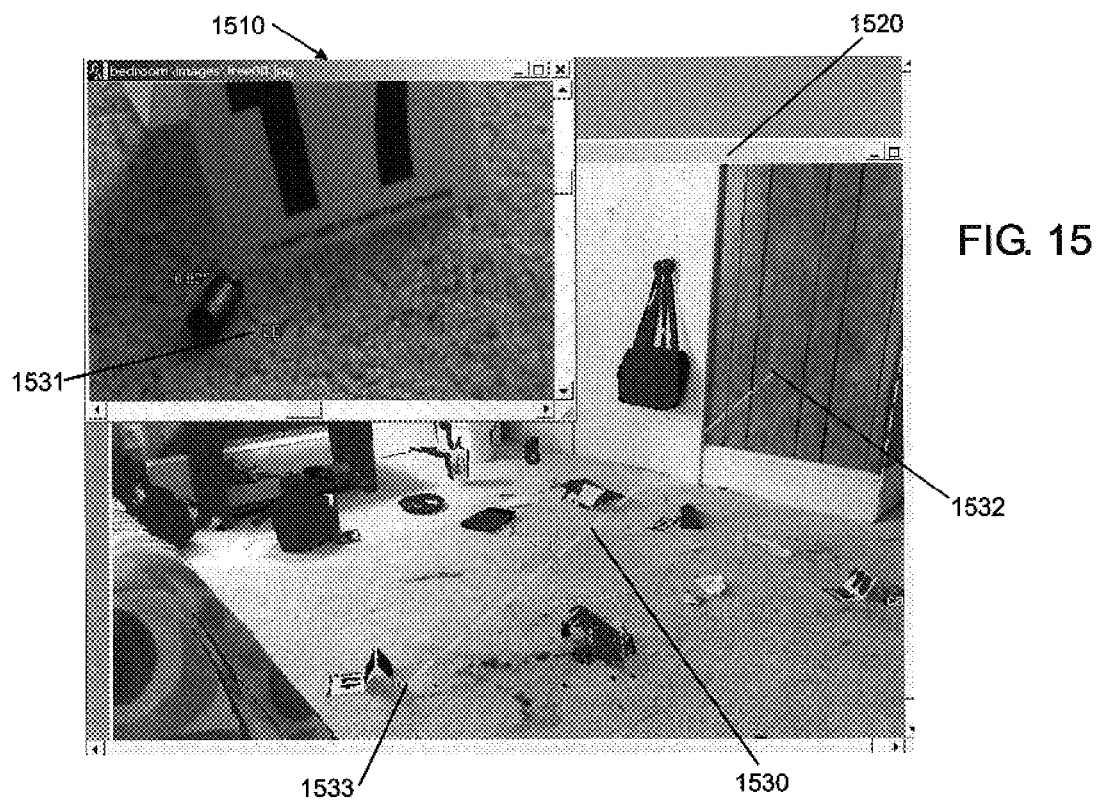
FIG. 15 is a diagram illustrating a high resolution registered color image corresponding to a hot spot which has been selected within a 3D surface display of a 3D data set and showing an additional form of measurement between two points and images thereof, according to some embodiments of the present invention.

FIG. 15 illustrates aspects of embodiments of the present invention. The 2D Hot Spot Display Method has been used to show the registered high-resolution 2D image 1510 that is presented when the user selects the "casing 17" Hot Spot 1220 as illustrated in FIG. 12. A 3D normal-resolution texture-mapped surface display overview of the scene is also shown 1520. A 3D measurement 1530 has been made by selecting one line endpoint "LE" 1531 within the registered high-resolution 2D image 1510 and selecting another endpoint 1532 within the 3D normal-resolution texture-mapped surface display 1520. Note that point 1533 represents point 1531 displayed within the 3D display 1520.

Figure 16:
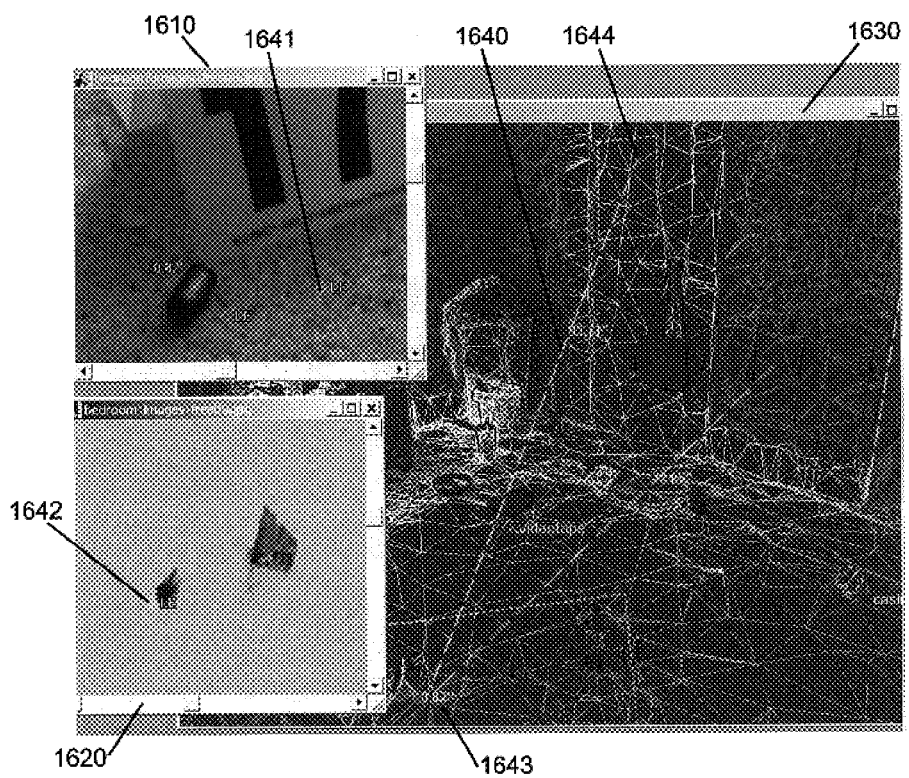
FIG. 16 is a diagram illustrating two high resolution registered color images corresponding to hot spots which have been selected within a 3D mesh display of a 3D data set and showing an additional form of measurement between two points and images thereof, according to some embodiments of the present invention.

FIG. 16 illustrates aspects of embodiments of the present invention. The 2D Hot Spot Display Method has been used to show the registered high-resolution 2D image 1610 that is presented when the user selects the "casing 17" Hot Spot 1220 as illustrated in FIG. 12. The 2D Hot Spot Display Method has also been used to show the registered high-resolution 2D image 1620 that is presented when the user selects the "door" Hot Spot 1230 as illustrated in FIG. 12. A 3D colored mesh display overview of the scene is also shown 1630. A 3D measurement 1640 has been made by selecting one line endpoint "LE" 1641 within the "casing 17" registered high-resolution 2D image 1610 and selecting another line endpoint "LE" 1642 within the "door" registered high-resolution 2D image 1620. Note that point 1643 represents point 1641 displayed in 3D image 1630 and point 1644 represents point 1642 displayed in 3D image 1630.

Figure 17:
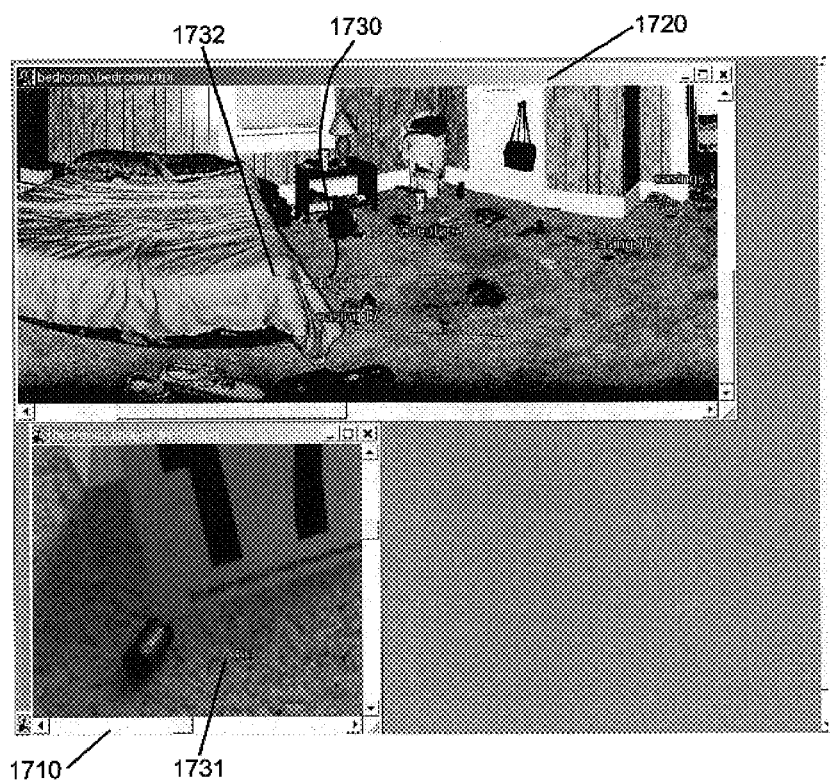
FIG. 17 is a diagram illustrating a high resolution registered color image corresponding to a hot spot which has been selected within a reflectance image display of a 3D data set and showing an additional form of measurement between two points and images thereof, according to some embodiments of the present invention.

FIG. 17 illustrates aspects of embodiments of the present invention. The 2D Hot Spot Display Method has been used to show the registered high-resolution 2D image 1710 that is presented when the user selects the "casing 17" Hot Spot 1220 as illustrated in FIG. 12. A 2D reflectance image display overview of the scene is also shown 1720. A 3D measurement 1730 has been made by selecting one line endpoint "LE" 1731 within the registered high-resolution 2D image 1710 and selecting another endpoint 1732 within the 2D reflectance image display 1720.

Figure 18:
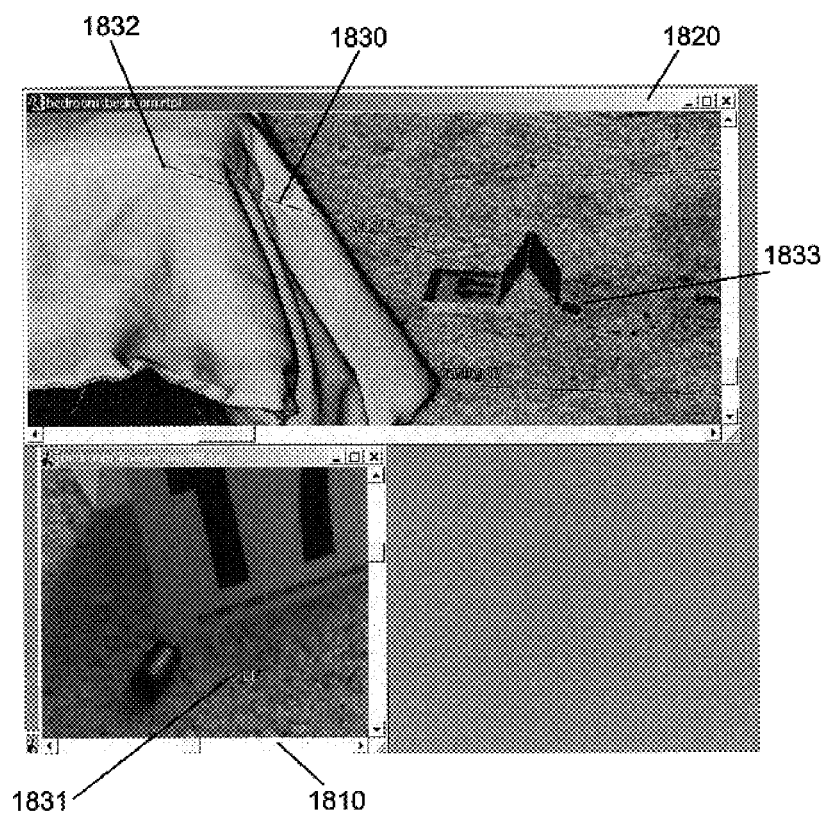
FIG. 18 is a diagram illustrating a high resolution registered color image corresponding to a hot spot which has been selected within a reflectance image display of a 3D data set and showing an additional form of measurement between two points and images thereof, according to some embodiments of the present invention.

FIG. 18 illustrates aspects of embodiments of the present invention. The 2D Hot Spot Display Method has been used to show the registered high-resolution 2D image 1810 that is presented when the user selects the "casing 17" Hot Spot 1220 as illustrated in FIG. 12. A zoomed-in 2D reflectance image display of the scene is also shown 1820. A 3D measurement 1830 has been made by selecting one line endpoint "LE" 1831 within the registered high-resolution 2D image 1810 and selecting another endpoint 1832 within the 2D reflectance image display 1820. Note that point 1833 represents point 1831 displayed within the reflectance image 1820.

Figure 19:
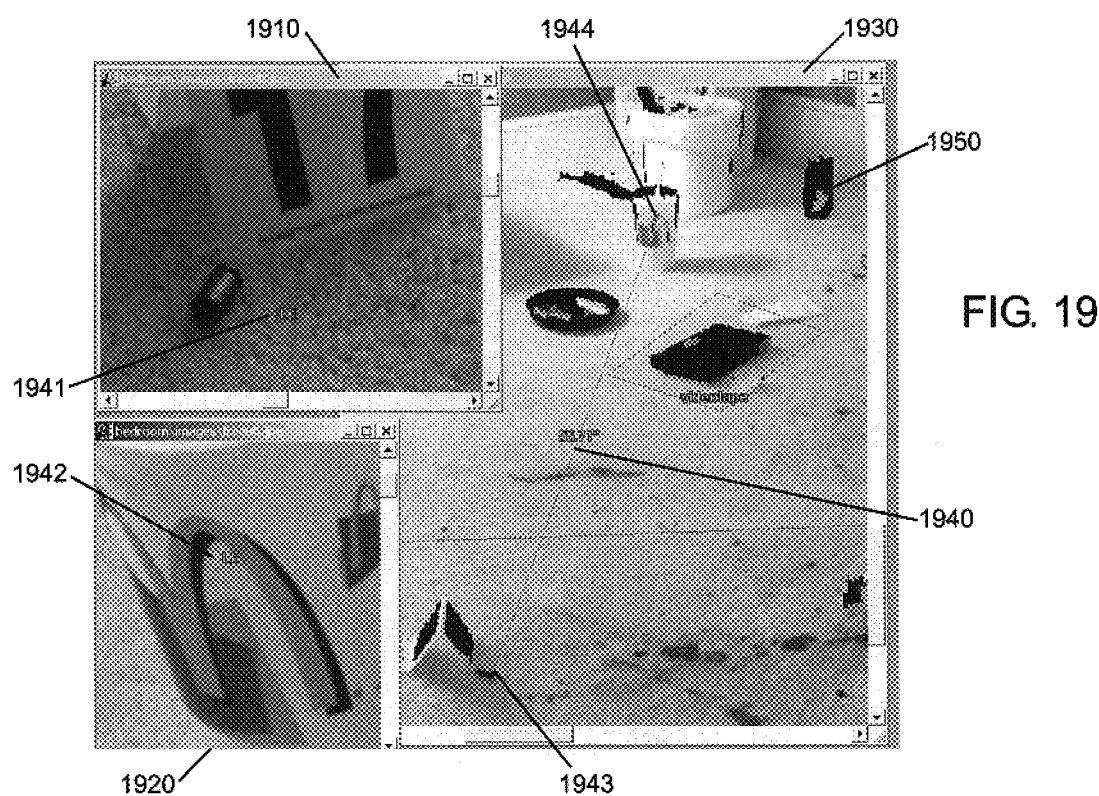
FIG. 19 is a diagram illustrating two high resolution registered color images corresponding to hot spots which have been selected within a normal resolution color image display of a 3D data set and showing an additional form of measurement between two points and images thereof, according to some embodiments of the present invention.

FIG. 19 illustrates aspects of embodiments of the present invention. The 2D Hot Spot Display Method has been used to show the registered high-resolution 2D image 1910 that is presented when the user selects the "casing 17" Hot Spot 1220 as illustrated in FIG. 12. The 2D Hot Spot Display Method has also been used to show the registered high-resolution 2D image 1920 that is presented when the user selects the "videotape" Hot Spot 1210 as illustrated in FIG. 12. A 2D normal-resolution registered color image display overview of the scene is also shown 1930. Note that black spots such as 1950 exist where no 3D rangefinder data exists because of poor laser reflectance from the target surface. Since color is assigned only to existing 3D range data points in the conventional process of creating a normal-resolution color registered image, these black areas are not uncommon. A 3D measurement 1940 has been made by selecting one line endpoint "LE" 1941 within the "casing 17" registered high-resolution 2D image 1910 and selecting another line endpoint "LE" 1942 within the "videotape" registered high-resolution 2D image 1920. The advantages of having high-resolution images 1910 and 1920 available for analysis is very clear when compared to the normal resolution image 1930. Note that point 1943 represents point 1941 displayed within the normal resolution image 1930. Note that point 1944 represents point 1942 displayed within the normal resolution image 1930.

FIG. 20 illustrates further aspects of embodiments of the present invention. The bottom window 2020 is a reflectance image representing a 3D range data set of a simulated murder scene acquired by a 3D rangefinder. The 2D Hot Spot Display Method has been used to show a registered high-resolution 2D image in the top window 2010. The middle window is a 3D colored mesh display 2030 representing the same 3D range data. The landmark point labeled "weapon" 2011 was selected in the high-resolution registered color image. Illustrated is the display of the same measurement point 2011, 2021, and 2031 within three windows 2010, 2020, and 2030 respectively which are displayed as three different image display formats. Also illustrated is the novel technique of creating a pop-up window 2040 containing information and a link to additional data files and which may be accessed by selecting any measurement 2011, 2021, or 2031 within three windows 2010, 2020, and 2030 respectively which are displayed as three different image display formats.

Thus it can readily be seen that the ability to display and make measurements using high-resolution 2D image data which is displayed within the context of lower-resolution 3D data provides valuable advantages over conventional methods. The new techniques provide greater ease of use, accuracy, and clarity in many applications, particularly in the understanding, analysis, and presentation of complex scenes.

Many modifications and other embodiments of the invention will come to mind to one skilled in the art to which this invention pertains having the benefit of the teachings presented in the foregoing descriptions and the associated figures. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way

What is claimed is:

1. A method for displaying a 2D image data set obtained using a 2D imaging device combined with a 3D range data set obtained using a 3D rangefinder device, comprising:
   providing a 3D range data set;
   providing at least one 2D image data set having a different resolution than the 3D range data set;
   representing the 3D range data set as a first displayed image;
   representing the at least one 2D image data set as at least a second displayed image;
   identifying corresponding features within the first displayed image and within the at least one second displayed image respectively;
   computing a 3D transformation between the 3D range data set and the at least one 2D image data set based on geometry of the identified corresponding features, such that geometric correspondence between the 3D range data set and the at least one 2D image data set is determined;
   representing the at least one 2D image data set as a third displayed image; and
   computing a 3D coordinate for a specified pixel of the third displayed image based on the previously computed 3D transformation and the 3D range data set.

2. The method of claim 1, wherein the step of representing the at least one 2D image data set as the third displayed image comprises representing at least part of the 3D range data as 3D surfaces and representing at least part of the at least one 2D image data set as texture maps on at least part of the 3D surfaces according to the previously computed 3D transformation.

3. A method for displaying a 2D image data set obtained using a 2D imaging device combined with a 3D range data set obtained using a 3D rangefinder device, comprising:

provide a 3D range data set;

providing at least one 2D image data set which differs from the 3D range data set in at least one of resolution, origin, and both resolution and origin;

representing the 3D range data set as a first displayed image;

representing the at least one 2D image data set as at least a second displayed image;

identifying corresponding features within the first displayed image and within at least one second displayed image respectively;

computing a 3D transformation between the 3D range data set and the at least one 2D image data set based on the geometry of the specified corresponding features, such that the geometric correspondence between the 3D range data set and at least one 2D image data set is determined; and representing the at least one 2D image data set as a third displayed image wherein a 3D coordinate can be computed for any specified pixel of the at least one 2D image data set based on the previously computed 3D transformation and the 3D range data set, wherein the step of representing the at least one 2D image data set as the third displayed image further comprises the steps of representing the 3D range data set as a fourth displayed image wherein a hot spot area associated with all or some of the at least one 2D image data set is indicated by highlighting therein, selecting the hot spot area interactively, and representing the at least one 2D image data set associated with the selected hot spot area as the third displayed image.

4. The method of claim 1, further comprising the steps of identifying at least a first feature within the third displayed image; identifying at least a second feature within one of the first displayed image, the second displayed image, and the third displayed image; computing a 3D coordinate for at least the first feature based on the at least one 2D image data set, the previously computed 3D transformation, and the 3D range data set; and computing 3D coordinates for the at least second feature.

5. The method of claim 4, wherein identifying features comprises one of using a computer cursor controlled by a mouse to identify, using a computer cursor controlled by a pointing stick to identify, using a computer cursor controlled by a joystick to identify, using a computer cursor controlled by a touch pad to identify, using software to identify, and using combinations of the above to identify.

6. The method of claim 4, wherein identifying features comprises at least one technique selected from the group consisting of using sub-pixel interpolation in any 2D displayed image wherein a software tool may allow the user to estimate and specify the location of a feature anywhere within a pixel and not just at its origin, using interpolation between measured 3D range data points on surfaces in any 3D displayed image wherein a software tool may allow the user to estimate and specify the location of a feature anywhere upon a surface even if that particular location is not directly associated with a measured 3D range data point, using estimates of the centers of features wherein the user may estimate and specify the location of the center of a feature even if the particular pixel at that chosen center appears no different from adjacent pixels, and using holes and data interpolated across holes wherein the rangefinder device did not acquire a range measurement and wherein a software tool may allow the user to estimate and specify the location of a feature anywhere within a hole even though that particular location is not directly associated with a measured 3D range data point.

7. The method of claim 4, further comprising the step of displaying the computed measurement.

8. The method of claim 7, wherein the step of displaying represents displaying at least one display selected from the group consisting of a measurement point displayed, a plurality of measurement points displayed, a measurement line displayed, a plurality of measurement lines displayed, a measurement surface displayed, a plurality of measurement surfaces displayed, a measurement volume displayed, a plurality of measurement volumes displayed, a measurement feature displayed, a plurality of measurement features displayed, and combinations thereof displayed.

9. The method of claim 1, wherein the at least one 2D image data set is provided by a 2D imaging device selected from the group consisting of a color digital still camera, a monochrome digital still camera, a color digital video camera, a monochrome digital video camera, a color analog video camera with digital conversion, a monochrome analog video camera with digital conversion, a color film camera with the film or print made from the film subsequently being digitized for use as a 2D image data set, a monochrome film camera with the film or print made from the film subsequently being digitized for use as a 2D image data set, a color digital line scan camera, a monochrome digital line scan camera, a color digital panoramic scanning camera, a monochrome digital panoramic scanning camera, another device that acquires a multiplicity of image data points simultaneously, another device that acquires a multiplicity of image data points over a period of time, and combinations of the preceding.

10. The method of claim 1, wherein the 3D range data set is provided by a 3D rangefinder device selected from the group consisting of a scanning laser rangefinder using time of flight range measurement principles, a scanning laser rangefinder using phase comparison range measurement principles, a scanning laser rangefinder using any other range measurement principles, an imaging laser rangefinder range camera using time of flight range measurement principles, an imaging laser rangefinder range camera using phase comparison range measurement principles, an imaging laser rangefinder range camera using any other range measurement principles, a triangulation rangefinder, a stereo image rangefinder, a multiple image rangefinder, any other device that acquires a multiplicity of range data points simultaneously, and any other device that acquires a multiplicity of range data points over a period of time and combinations of the above.

11. The method of claim 1, wherein the displayed image comprises a 2D image selected from the group consisting of a 2D range image comprising range values from the 3D rangefinder device converted to monochrome, a 2D range image comprising range values from the 3D rangefinder device converted to false color, a 2D reflectance image comprising intensity values of the rangefinding signal reflected from a physical surface and thereafter received by the 3D rangefinder device converted to monochrome, a 2D reflectance image comprising intensity values of the rangefinding signal reflected from a physical surface and thereafter received by the 3D rangefinder device converted to false color, a 2D registered color image comprising a color camera image previously registered with 3D range data, a 2D registered color image wherein the image is acquired from the same perspective as the 3D range data set, a 2D registered color image wherein the image is acquired from a different perspective than the 3D range data set, a 2D registered color image wherein the image is acquired with the same resolution as the 3D range data set, a 2D registered color image wherein the image is acquired with different resolution from the 3D range data set, a 2D image displayed in spherical projection format, a 2D image displayed in any other 3D-to-2D projection format, and a 2D registered monochrome image comprising a monochrome camera image previously registered with 3D range data.

12. The method of claim 1, wherein the displayed image comprises a 3D image selected from the group consisting of a 3D point display, a 3D point display in orthogonal projection, a 3D point display in perspective projection, a 3D polygonal mesh, a 3D polygonal mesh in orthogonal projection, a 3D polygonal mesh in perspective projection, a 3D surface geometry display, a 3D surface geometry display in orthogonal projection, and a 3D surface geometry display in perspective projection.

13. The method of claim 1, implemented in a computer processor executing a suitable computer software program product executing therein.

14. The method of claim 1, implemented in a suitable computer software program product embodied on computer readable tangible media.

15. The method of claim 1, wherein the 3D range data set is represented by at least two displayed images.

16. The method of claim 1, further comprising the steps of providing at least a second 3D range data set; representing the at least second 3D range data set as at least a fourth displayed image; identifying corresponding features within the fourth displayed image and within the second displayed image respectively; and computing a 3D transformation between the at least second 3D range data set and the at least one 2D image data set based on the geometry of the specified corresponding features, such that the geometric correspondence between the at least second 3D range data set and the at least one 2D image data set is determined.

17. The method of claim 16, wherein the step of representing the at least one 2D image data set as a third displayed image comprises the step of representing the at least one 2D image data set as a third displayed image; and wherein a 3D coordinate can be computed for any specified pixel of the at least one 2D image data set based on the previously computed 3D transformation and at least one of the first 3D range data set and the second 3D range data set.

18. A computer program product stored in computer readable media for execution in at least one processor for displaying a 2D image data set obtained using a 2D imaging device combined with a 3D range data set obtained using a 3D rangefinder device, comprising:
 a first software module for providing a first 3D range data set;
 a second software module for providing at least one 2D image data set having a different resolution than the 3D range data set;
 a third software module for representing the 3D range data set as a first displayed image;
 a fourth software module for representing the at least one 2D image data set as at least a second displayed image;
 a fifth software module for identifying corresponding features within the first displayed image and within at least one second displayed image respectively;
 a sixth software module for computing a 3D transformation between the 3D range data set and the at least one 2D image data set based on the geometry of the specified corresponding features, such that the geometric correspondence between the 3D range data set and at least one 2D image data set is determined; and
 a seventh software module for representing the at least one 2D image data set as a third displayed image and for computing a 3D coordinate for a specified pixel of the third displayed image based on the previously computed 3D transformation and the 3D range data set.

19. The computer program product of claim 18, wherein the step of representing the at least one 2D image data set as the third displayed image comprises representing at least part of the 3D range data as 3D surfaces and representing at least part of the at least one 2D image data set as texture maps on at least part of the 3D surfaces according to the previously computed 3D transformation.

20. A computer program product stored in computer readable media for execution in at least one processor for displaying a 2D image data set obtained using a 2D imaging device combined with a 3D range data set obtained using a 3D rangefinder device, comprising:
 a first software module for providing a first 3D range data set;
 a second software module for providing at least one 2D image data set which differs from the 3D range data set in at least one of resolution, origin, and both resolution and origin;
 a third software module for representing the 3D range data set as a first displayed image;
 a fourth software module for representing the at least one 2D image data set as at least a second displayed image;
 a fifth software module for identifying corresponding features within the first displayed image and within at least one second displayed image respectively;
 a sixth software module for computing a 3D transformation between the 3D range data set and the at least one 2D image data set based on the geometry of the specified corresponding features, such that the geometric correspondence between the 3D range data set and at least one 2D image data set is determined; and
 a seventh software module for representing the at least one 2D image data set as a third displayed image wherein a 3D coordinate can be computed for any specified pixel of the at least one 2D image data set based on the previously computed 3D transformation and the 3D range data set, wherein the step of representing the at least one 2D image data set as the third displayed image further comprises the steps of representing the 3D range data set as a fourth displayed image wherein a hot spot area associated with all or some of the at least one 2D image data set is indicated by highlighting therein; selecting the hot spot area interactively; and representing the at least one 2D image data set associated with the selected hot spot area as the third displayed image.

21. The computer program product of claim 18, further comprising the steps of identifying at least a first feature within the third displayed image; identifying at least a second feature within one of the first displayed image, the second displayed image, and the third displayed image; computing a 3D coordinate for at least the first feature based on the at least one 2D image data set, the previously computed 3D transformation, and the 3D range data set; and computing 3D coordinates for the at least second feature.

22. An apparatus for displaying a 2D image data set obtained using a 2D imaging device combined with a 3D range data set obtained using a 3D rangefinder device, comprising:
 at least one computer processor;

a computer program product executing within the at least one computer processor, wherein the computer program product further comprises at least the following software modules therein;

a first software module for providing a first 3D range data set;

a second software module for providing at least one 2D image data set having a different resolution than the 3D range data set;

a third software module for representing the 3D range data set as a first displayed image;

a fourth software module for representing the at least one 2D image data set as at least a second displayed image;

a fifth software module for identifying corresponding features within the first displayed image and within at least one second displayed image respectively;

a sixth software module for computing a 3D transformation between the 3D range data set and the at least one 2D image data set based on the geometry of the specified corresponding features, such that the geometric correspondence between the 3D range data set and at least one 2D image data set is determined; and a seventh software module for representing the at least one 2D image data set as a third displayed image and for computing a 3D coordinate for a specified pixel of the third displayed image based on the previously computed 3D transformation and the 3D range data set.

23. The apparatus of claim 22, wherein the step of representing the at least one 2D image data set as the third displayed image comprises representing at least part of the 3D range data as 3D surfaces and representing at least part of the at least one 2D image data set as texture maps on at least part of the 3D surfaces according to the previously computed 3D transformation.

24. An apparatus for displaying a 2D image data set obtained using a 2D imaging device combined with a 3D range data set obtained using a 3D rangefinder device, comprising:

at least one computer processor;

a computer program product executing within the at least one computer processor, wherein the computer program product further comprises at least the following software modules therein;

a first software module for providing a first 3D range data set;

a second software module for providing at least one 2D image data set which differs from the 3D range data set in at least one of resolution, origin, and both resolution and origin;

a third software module for representing the 3D range data set as a first displayed image;

a fourth software module for representing the at least one 2D image data set as at least a second displayed image;

a fifth software module for identifying corresponding features within the first displayed image and within at least one second displayed image respectively;

a sixth software module for computing a 3D transformation between the 3D range data set and the at least one 2D image data set based on the geometry of the specified corresponding features, such that the geometric correspondence between the 3D range data set and at least one 2D image data set is determined; and a seventh software module for representing the at least one 2D image data set as a third displayed image wherein a 3D coordinate can be computed for any specified pixel of the at least one 2D image data set based on the previously computed 3D transformation and the 3D range data set, wherein the step of representing the at least one 2D image data set as the third displayed image further comprises the steps of representing the 3D range data set as a fourth displayed image wherein a hot spot area associated with all or some of the at least one 2D image data set is indicated by highlighting therein; selecting the hot spot area interactively; and representing the at least one 2D image data set associated with the selected hot spot area as the third displayed image.

25. The apparatus of claim 22, further comprising the steps of identifying at least a first feature within the third displayed image; identifying at least a second feature within one of the first displayed image, the second displayed image, and the third displayed image; computing a 3D coordinate for at least the first feature based on the at least one 2D image data set, the previously computed 3D transformation, and the 3D range data set; and computing 3D coordinates for the at least second feature.

26. The method of claim 1 wherein computing the 3D coordinate for a specified pixel of the third displayed image includes at least one of interpolating between a plurality of 3D range data points and performing sub-pixel interpolation of a plurality of pixels of the third displayed image.

27. The method of claim 1 wherein the 2D image data set has a different origin from the 3D range data set.

28. The computer program product of claim 18 wherein computing the 3D coordinate for a specified pixel of the third displayed image includes at least one of interpolating between a plurality of 3D range data points and performing sub-pixel interpolation of a plurality of pixels of the third displayed image.

29. The computer program product of claim 18 wherein the 2D image data set has a different origin from the 3D range data set.

30. The apparatus of claim 22 wherein computing the 3D coordinate for a specified pixel of the third displayed image includes at least one of interpolating between a plurality of 3D range data points and performing sub-pixel interpolation of a plurality of pixels of the third displayed image.

31. The apparatus of claim 22 wherein the 2D image data set has a different origin from the 3D range data set.

* * * * *